United States Patent
Miller

(10) Patent No.: US 11,130,438 B2
(45) Date of Patent: Sep. 28, 2021

(54) PROPANE TANK TIE DOWN SYSTEM AND METHOD OF USE

(71) Applicant: Heath Miller, Round Rock, TX (US)

(72) Inventor: Heath Miller, Round Rock, TX (US)

( * ) Notice: Subject to any disclaimer, the term of this patent is extended or adjusted under 35 U.S.C. 154(b) by 78 days.

(21) Appl. No.: 16/586,922

(22) Filed: Sep. 28, 2019

(65) Prior Publication Data

US 2021/0094461 A1 Apr. 1, 2021

(51) Int. Cl.
*B60P 7/08* (2006.01)
*B60P 7/12* (2006.01)
*B60P 7/135* (2006.01)
*F17C 13/08* (2006.01)

(52) U.S. Cl.
CPC ............ *B60P 7/0823* (2013.01); *B60P 7/0807* (2013.01); *B60P 7/12* (2013.01); *B60P 7/135* (2013.01); *F17C 13/084* (2013.01); *F17C 2201/0104* (2013.01); *F17C 2221/035* (2013.01)

(58) Field of Classification Search
CPC ....... B60P 7/0807; B60P 7/065; B60P 7/0823; B60P 7/12; B60P 7/135; B60Y 2410/132
USPC .................................................... 410/96, 106
See application file for complete search history.

(56) References Cited

U.S. PATENT DOCUMENTS

| | | | | |
|---|---|---|---|---|
| 852,623 A * | 5/1907 | Roth | ......................... | A62B 1/14 182/7 |
| 1,396,270 A * | 11/1921 | Grierson | ............... | F41C 33/001 224/150 |
| 2,563,698 A * | 8/1951 | Whitebread | ......... | A47G 29/093 248/499 |
| 3,120,403 A * | 2/1964 | Molzan | ..................... | B66C 1/18 294/74 |
| 3,998,367 A * | 12/1976 | Harding | ................ | F41B 5/1461 224/625 |
| 4,878,274 A * | 11/1989 | Patricy | .................... | A44B 18/00 24/306 |
| 4,918,790 A * | 4/1990 | Cirket | .................. | A44B 11/006 24/442 |
| 5,063,641 A * | 11/1991 | Chuan | .................... | A44B 11/18 24/197 |
| 5,083,692 A * | 1/1992 | Treese | ...................... | A45F 3/15 224/615 |
| 5,092,505 A * | 3/1992 | Olschlager | .............. | F41C 23/02 224/149 |
| 5,136,759 A * | 8/1992 | Armour, II | ............. | A44B 18/00 24/16 R |
| 5,330,148 A * | 7/1994 | Floyd | ..................... | B60P 3/075 224/42.4 |

(Continued)

*Primary Examiner* — Hilary L Gutman
(74) *Attorney, Agent, or Firm* — Shannon Warren

(57) ABSTRACT

A tank tiedown system for securing a tank during transport in a vehicle. The tank tiedown system comprises a perimeter strap assembly, a first hook-and-loop fastener assembly having a first fastener portion and a second fastener portion, a one or more snap hook assemblies, and one or more ring buckles, the one or more ring buckles comprise at least a second ring buckle. The perimeter strap assembly comprises a first end and a second end. The second ring buckle is attached to the second end of the perimeter strap assembly. The first fastener portion and the second fastener portion are attached to the first end of the perimeter strap assembly with the first fastener portion more proximate to the first end than the second fastener portion.

17 Claims, 14 Drawing Sheets

(56) References Cited

U.S. PATENT DOCUMENTS

| | | | | |
|---|---|---|---|---|
| 5,603,591 | A * | 2/1997 | McLellan | B60P 7/0823 |
| | | | | 224/318 |
| 5,799,849 | A | 9/1998 | Beer | |
| 6,013,045 | A * | 1/2000 | Gaylord | A61F 13/04 |
| | | | | 602/20 |
| 6,386,559 | B1 * | 5/2002 | Souza | B60R 7/043 |
| | | | | 280/47.26 |
| D494,919 | S * | 8/2004 | Davis | D12/223 |
| 7,316,435 | B2 | 1/2008 | Leighton | |
| 8,336,503 | B2 * | 12/2012 | Spinelli | A47D 13/086 |
| | | | | 119/770 |
| 9,321,404 | B1 * | 4/2016 | Mellenthin | F17C 13/084 |
| 9,499,105 | B1 * | 11/2016 | Long | B60P 3/055 |
| 9,656,591 | B1 * | 5/2017 | Dumenigo | A44B 11/16 |
| D813,651 | S * | 3/2018 | Votel | D8/356 |
| 9,968,476 | B2 * | 5/2018 | Hatto | A61F 5/3738 |
| D862,005 | S * | 10/2019 | Gabriele | D30/152 |
| 2014/0063500 | A1 | 3/2014 | Danhamer | |
| 2015/0150342 | A1 * | 6/2015 | Danze | B60P 7/0823 |
| | | | | 24/68 E |
| 2016/0325669 | A1 * | 11/2016 | Byham | B60P 7/0807 |
| 2018/0272915 | A1 * | 9/2018 | Young | B60P 7/10 |

* cited by examiner

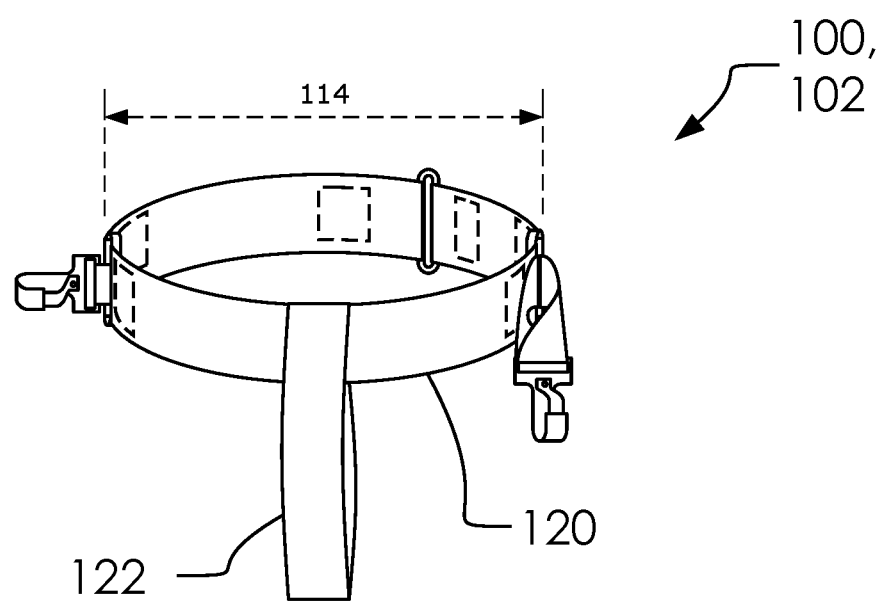
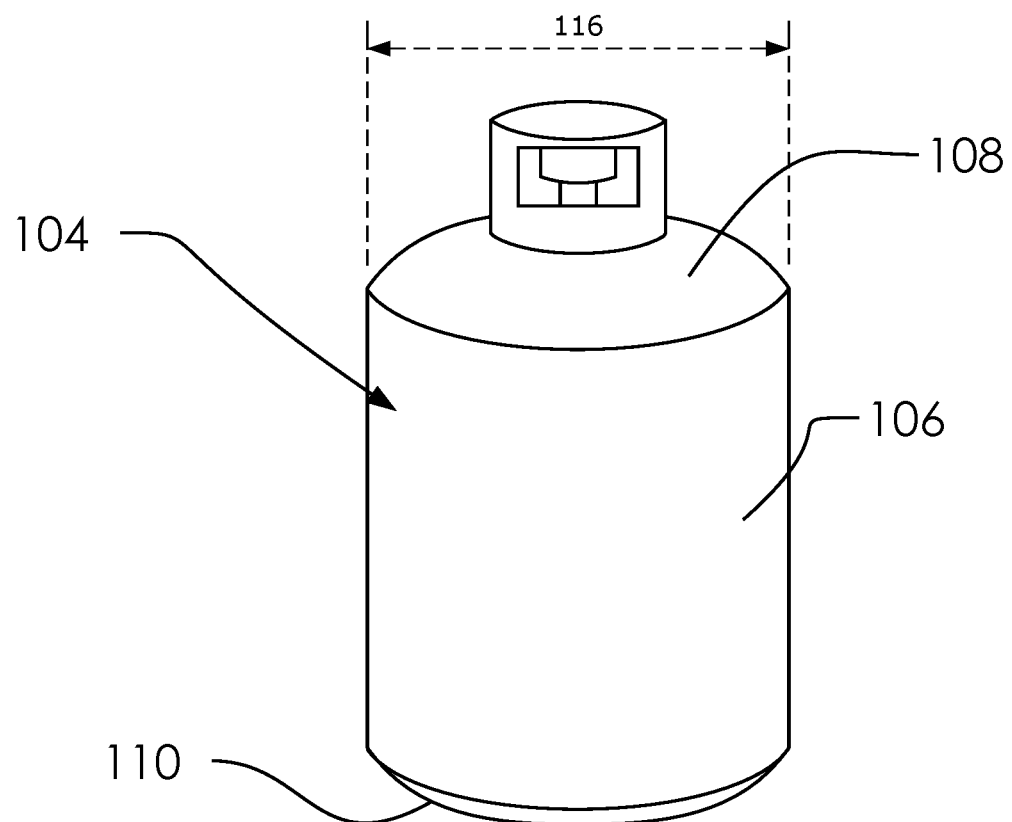
FIG. 1

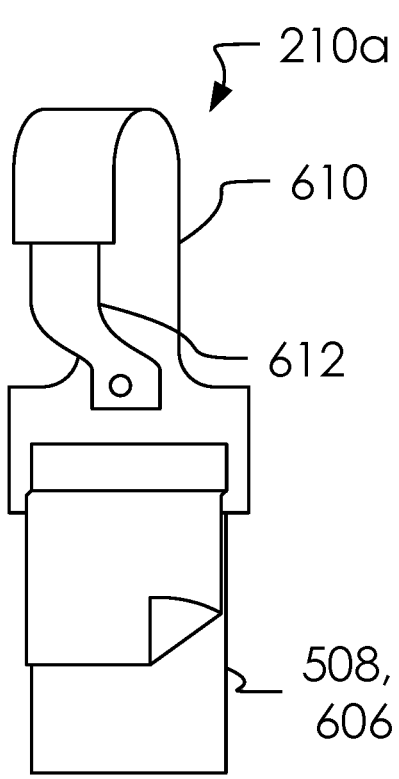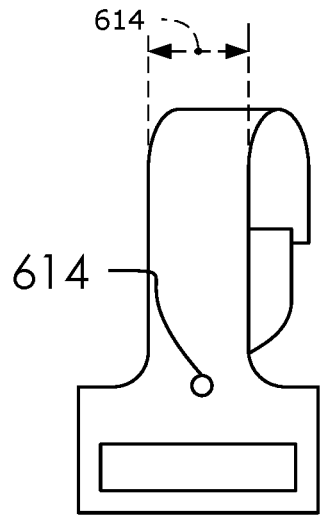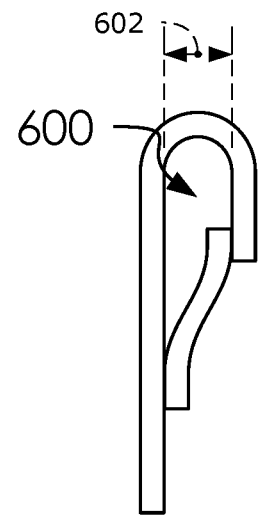
FIG. 6A  FIG. 6B  FIG. 6C
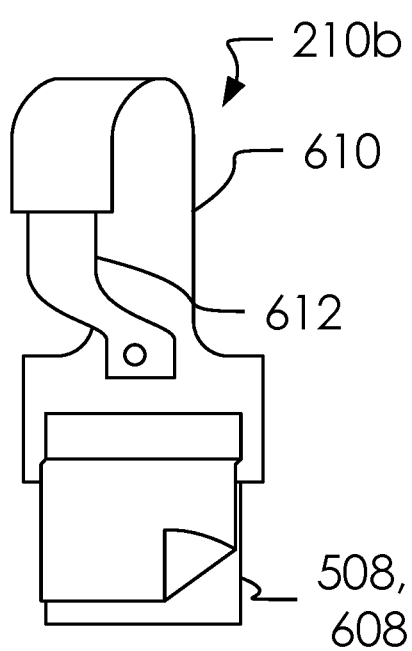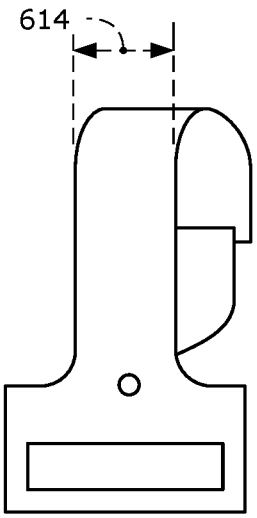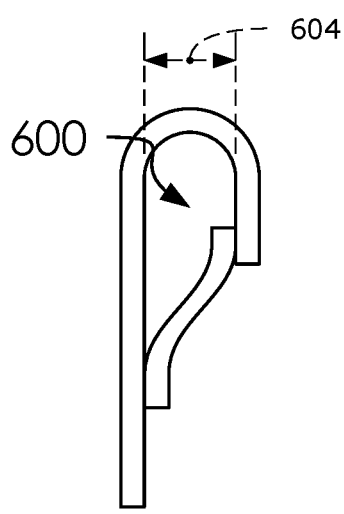
FIG. 6D  FIG. 6E  FIG. 6F

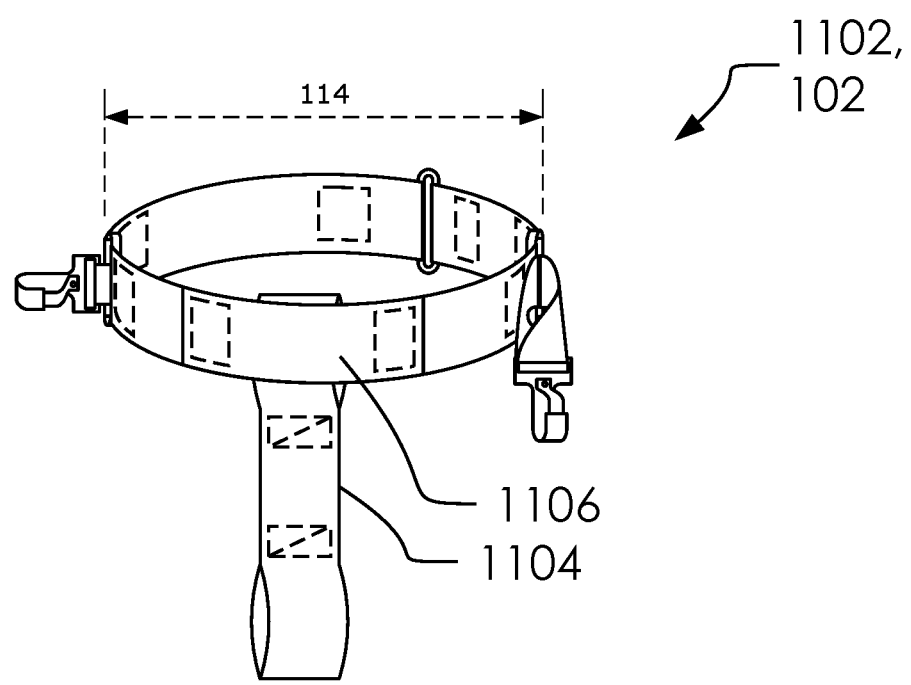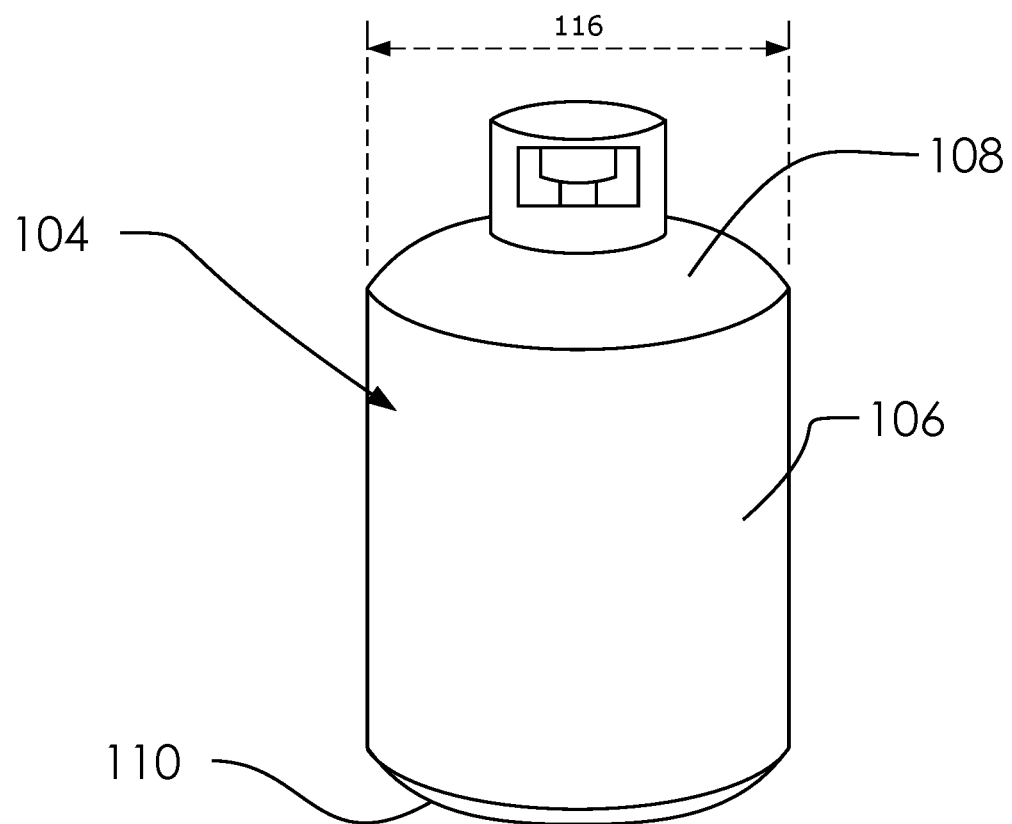
FIG. 11

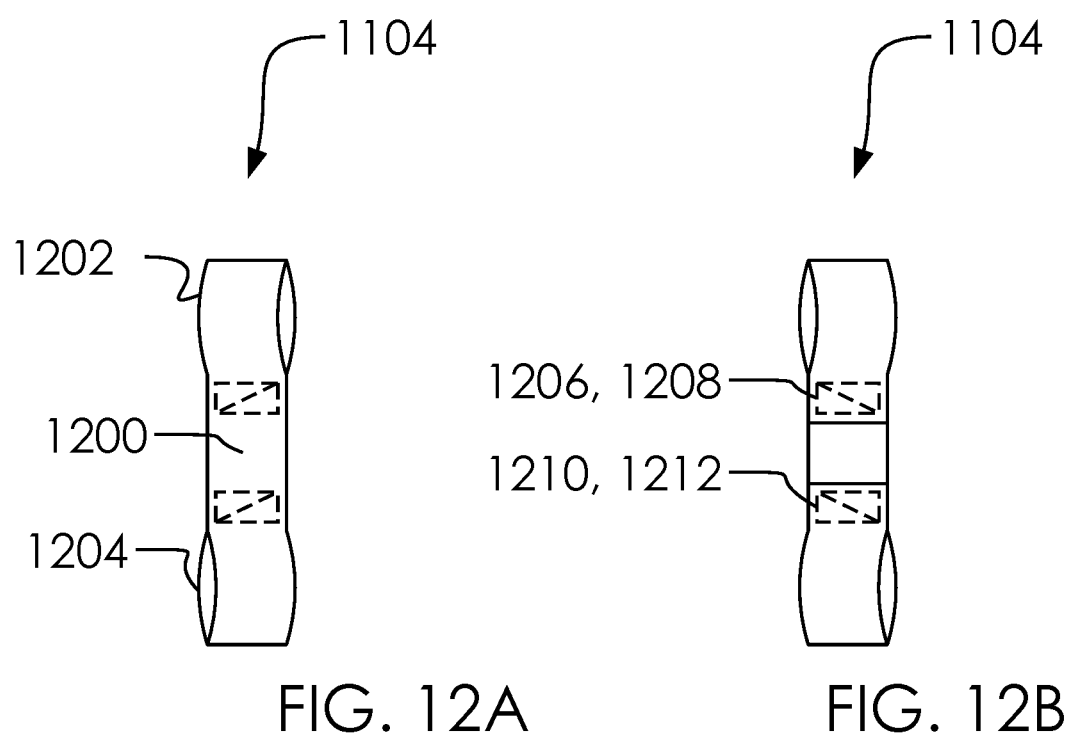

PROPANE TANK TIE DOWN SYSTEM AND METHOD OF USE

CROSS-REFERENCE TO RELATED APPLICATIONS

Not applicable.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

Disclosed herein is a tank tiedown system 100 and method of use thereof which can eliminate challenges with securely transporting individual one or more a tank 104.

Existing methods of transporting one or more said tank 104 either do not securely connect to the transporting vehicle or require separate and generic connection devices not specifically designed for the purpose.

This invention can stay with said tank 104 eliminating the need for separate connection devices or methods.

Said tank tiedown system 100 enables multiple connection options with the transport vehicle eliminating the need for existing inconvenient and time-consuming methods. Said tank tiedown system 100 eliminates loose or unsecured one or more said tank 104.

This strap-based design with imbedded hooks is installed on said tank 104 to enable easy connection to the transport vehicle's cargo hooks, child car seat connection points or seat-belts.

Said tank tiedown system 100 can comprise an improvement on what currently exists. Previous means of transporting one or more said tank 104 relied on various methods including the use of general purpose bungee straps, cinch straps or ratchet straps. Other methods include wedging said tank 104 which is loose in a vehicle between seats, leveraging a separate heavy item for support or utilizing vehicle seat belts with no connection point to said tank 104.

One objective of said tank tiedown system 100 is to secure one or more said tank 104 which remain loose or unsecured in a vehicle. The relevant prior art, methods or devices used in connecting the one or more said tank 104 are inconvenient or time consuming.

This invention can stay with said tank 104 eliminating the need for separate connection devices or methods. Said tank tiedown system 100 enables multiple connection options with the transport vehicle eliminating the need for existing inconvenient and time-consuming methods. Said tank tiedown system 100 eliminates loose or unsecured one or more said tank 104.

Additionally: said tank tiedown system 100 could be used to secure any cylindrical device capable of being transported in a vehicle (i.e. tanks, cans, jugs, bottles, buckets, barrels, etc.).

Relevant prior art known to the Applicant includes: propane tank holders (U.S. Pat. Nos. 5,799,849A, 9,499,105B1, 9,321,404B1, US20140063500A1, and U.S. Pat. No. 6,386,559B1) and for propane tank vehicle anchors (U.S. Pat. Nos. 9,499,105B1, 7,316,435B2, 9,321,404B1, US20140063500A1, and U.S. Pat. No. 6,386,559B1).

BRIEF SUMMARY OF THE INVENTION a tank tiedown system 100 for securing a tank 104 during transport in a vehicle 118. Said tank tiedown system 100 comprises a perimeter strap assembly 120, a first hook-and-loop fastener assembly 208 having a first fastener portion 208a and a second fastener portion 208b, a one or more snap hook assemblies 210, and one or more ring buckles 204, said one or more ring buckles 204 comprise at least a second ring buckle 204b. Said perimeter strap assembly 120 comprises a first end 212 and a second end 214. Said second ring buckle 204b is attached to said second end 214 of said perimeter strap assembly 120. Said first fastener portion 208a and said second fastener portion 208b are attached to said first end 212 of said perimeter strap assembly 120 with said first fastener portion 208a more proximate to said first end 212 than said second fastener portion 208b. Said perimeter strap assembly 120 comprises a strap length 226. Said strap length 226 is long enough to secure said tank tiedown system 100 around said tank 104 by wrapping said perimeter strap assembly 120 around said tank 104, doubling a portion of said first end 212 back through a first ring buckle 204a, and attaching said first fastener portion 208a to said second fastener portion 208b of said first hook-and-loop fastener assembly 208. Said tank tiedown system 100 can comprise a variable diameter 114, and said tank 104 can comprise a tank diameter 116. Said tank tiedown system 100 can be configured to adjust said variable diameter 114 to match said variable diameter 114 and securely tighten around said tank 104. Said one or more snap hook assemblies 210 comprise at least a first snap hook assembly 210a. Said first snap hook assembly 210a attach to a portion of said perimeter strap assembly 120 and extends outward from said tank 104 with said tank tiedown system 100 attached around said tank 104. Said one or more snap hook assemblies 210 are configured to selectively hook and release an anchor point 808 to securely hold said tank 104 with said tank tiedown system 100 within said vehicle 118.

Said tank tiedown system 100 for securing said tank 104 during transport in said vehicle 118. Said tank tiedown system 100 comprises said perimeter strap assembly 120, said first hook-and-loop fastener assembly 208 having said first fastener portion 208a and said second fastener portion 208b, said one or more snap hook assemblies 210, and said one or more ring buckles 204, said one or more ring buckles 204 comprise at least said second ring buckle 204b. Said perimeter strap assembly 120 comprises said first end 212 and said second end 214. Said second ring buckle 204b is attached to said second end 214 of said perimeter strap assembly 120. Said first fastener portion 208a and said second fastener portion 208b are attached to said first end 212 of said perimeter strap assembly 120 with said first fastener portion 208a more proximate to said first end 212 than said second fastener portion 208b. Said perimeter strap assembly 120 comprises said strap length 226. Said strap length 226 is long enough to secure said tank tiedown system 100 around said tank 104 by wrapping said perimeter strap assembly 120 around said tank 104, doubling a portion of said first end 212 back through said first ring buckle 204a, and attaching said first fastener portion 208a to said second fastener portion 208b of said first hook-and-loop fastener assembly 208. Said tank tiedown system 100 can comprise said variable diameter 114, and said tank 104 can comprise said tank diameter 116. Said tank tiedown system 100 can be configured to adjust said variable diameter 114 to match said variable diameter 114 and securely tighten around said tank 104. Said one or more snap hook assemblies 210 comprise at least said first snap hook assembly 210*a*. Said first snap hook assembly 210*a* attach to a portion of said perimeter strap assembly 120 and extends outward from said tank 104 with said tank tiedown system 100 attached around said tank 104. Said one or more snap hook assemblies 210 are configured to selectively hook and release said anchor point 808 to securely hold said tank 104 with said tank tiedown system 100 within said vehicle 118. Said tank tiedown system 100 further comprises a belt loop assembly 122. Said belt loop assembly 122 attaches to a portion of said perimeter strap assembly 120. Said belt loop assembly 122 comprises a belt loop gap 414. Said belt loop gap 414 selectively receives a portion of vehicle seatbelt 1012 prior to buckling said vehicle seatbelt 1012 to securely hold said tank 104 with said tank tiedown system 100 within said vehicle 118 with said vehicle seatbelt 1012 in a buckled configuration 1014.

Said tank tiedown system 100 for securing said tank 104 during transport in said vehicle 118. Said tank tiedown system 100 comprises said perimeter strap assembly 120, said first hook-and-loop fastener assembly 208 having said first fastener portion 208*a* and said second fastener portion 208*b*, said one or more snap hook assemblies 210, and said one or more ring buckles 204, said one or more ring buckles 204 comprise at least said second ring buckle 204*b*. Said perimeter strap assembly 120 comprises said first end 212 and said second end 214. Said second ring buckle 204*b* is attached to said second end 214 of said perimeter strap assembly 120. Said first fastener portion 208*a* and said second fastener portion 208*b* are attached to said first end 212 of said perimeter strap assembly 120 with said first fastener portion 208*a* more proximate to said first end 212 than said second fastener portion 208*b*. Said perimeter strap assembly 120 comprises said strap length 226. Said strap length 226 is long enough to secure said tank tiedown system 100 around said tank 104 by wrapping said perimeter strap assembly 120 around said tank 104, doubling a portion of said first end 212 back through said first ring buckle 204*a*, and attaching said first fastener portion 208*a* to said second fastener portion 208*b* of said first hook-and-loop fastener assembly 208. Said tank tiedown system 100 can comprise said variable diameter 114, and said tank 104 can comprise said tank diameter 116. Said tank tiedown system 100 can be configured to adjust said variable diameter 114 to match said variable diameter 114 and securely tighten around said tank 104. Said one or more snap hook assemblies 210 comprise at least said first snap hook assembly 210*a*. Said first snap hook assembly 210*a* attach to a portion of said perimeter strap assembly 120 and extends outward from said tank 104 with said tank tiedown system 100 attached around said tank 104. Said one or more snap hook assemblies 210 are configured to selectively hook and release said anchor point 808 to securely hold said tank 104 with said tank tiedown system 100 within said vehicle 118. Said tank tiedown system 100 further comprises said belt loop assembly 122. Said belt loop assembly 122 attaches to a portion of said perimeter strap assembly 120. Said belt loop assembly 122 comprises said belt loop gap 414. Said belt loop gap 414 selectively receives a portion of said vehicle seatbelt 1012 prior to buckling said vehicle seatbelt 1012 to securely hold said tank 104 with said tank tiedown system 100 within said vehicle 118 with said vehicle seatbelt 1012 in said buckled configuration 1014. Said belt loop assembly 122 comprises a strap 314 comprising a first end 316 and a second end 318. attaching said belt loop assembly 122 to said perimeter strap assembly 120 comprises: wrapping said belt loop assembly 122 around a portion of said perimeter strap assembly 120, and sewing said first end 316 and said second end 318 of said strap 314 to a back side of said perimeter strap assembly 120.

BRIEF DESCRIPTION OF THE SEVERAL VIEWS OF THE DRAWING

FIG. 1 illustrates a perspective overview of a tank tiedown system 100 and a tank 104, in a detached configuration 102.

FIGS. 6A, 6B, 6C, 6D, 6E and 6F illustrate front, rear and side views of said first snap hook assembly 210*a* and said second snap hook assembly 210*b*.

FIG. 11 illustrates a perspective overview of a tank tie down system 1102.

FIGS. 12A and 12B illustrate an elevated front and rear view of said double belt loop assembly 1104.

DETAILED DESCRIPTION OF THE INVENTION

Figure 2A:
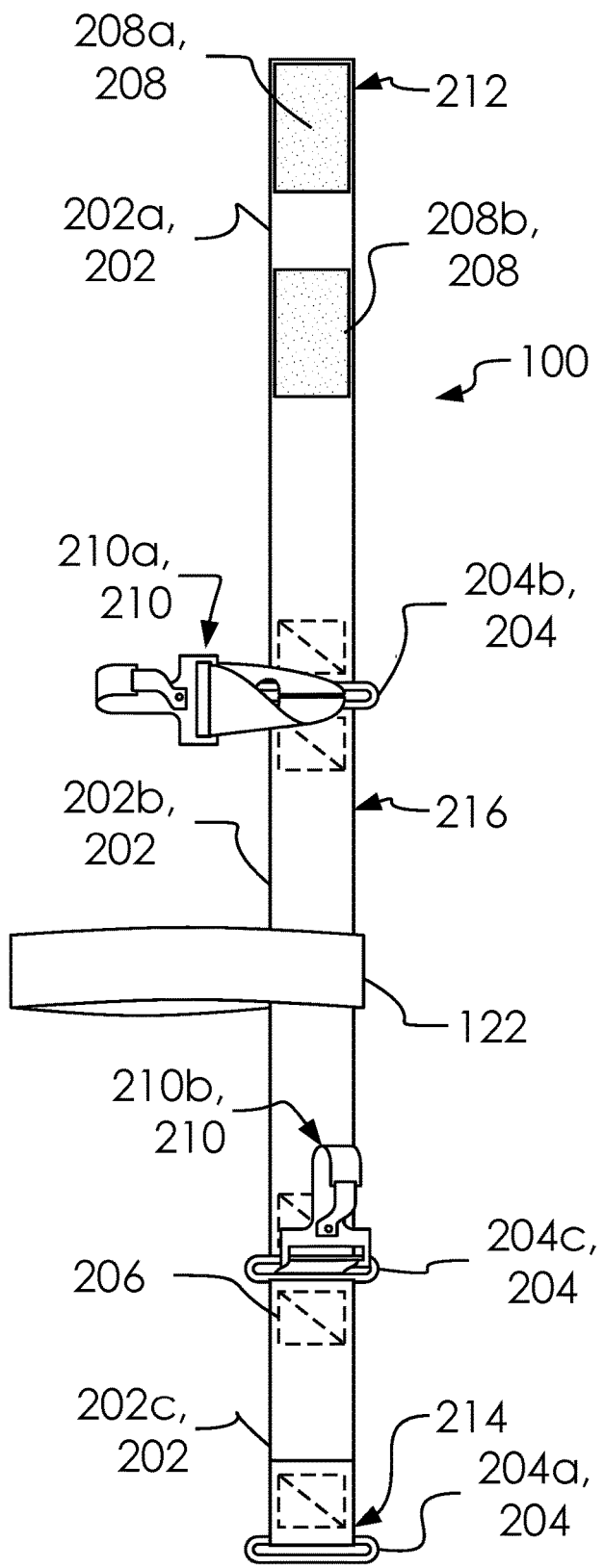
FIGS. 2A and 2B illustrate an elevated front and rear view of said tank tiedown system 100.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

FIG. 1 illustrates a perspective overview of a tank tiedown system 100 and a tank 104, in a detached configuration 102.

In one embodiment, said tank tiedown system 100 can be configured to securely hold said tank 104. In one embodiment, said tank tiedown system 100 can eliminate challenges in securing and/or transporting said tank 104, as illustrated and discussed below.

In one embodiment, said tank 104 can comprise a propane gas tank.

In one embodiment, said tank tiedown system 100 can attach to and remain attached to said tank 104 for the useful ownership period of said tank 104; e.g., attach to a new tank at the store, transport it home, extract gas from said tank 104 until empty, return to store, remove said tank tiedown system 100, exchange old tank for a new tank, attach said tank tiedown system 100 to the new tank.

Said tank tiedown system 100 can attach around a side wall 106 which can comprise an external circumference about a middle portion of said tank 104 between a top end 108 and a bottom end 110, as illustrated.

One objective of said tank tiedown system 100 can comprise securing said tank 104 in a vehicle 118 during transportation to and from a purchase site. A one or more connectors are provided to securely mount said tank 104 to a portion of a vehicle, as discussed below.

Additionally: said tank tiedown system 100 could be used to secure any cylindrical device capable of being transported in a vehicle (i.e. tanks, cans, jugs, bottles, buckets, barrels, etc.).

In one embodiment, said tank tiedown system 100 can comprise a variable diameter 114, and said tank 104 can comprise a tank diameter 116. Said tank tiedown system 100 can be configured to adjust said variable diameter 114 to match said tank diameter 116 and securely tighten around said tank 104, as discussed herein.

In one embodiment, said tank tiedown system 100 can comprise a perimeter strap assembly 120 and a belt loop assembly 122.

Figure 2B:
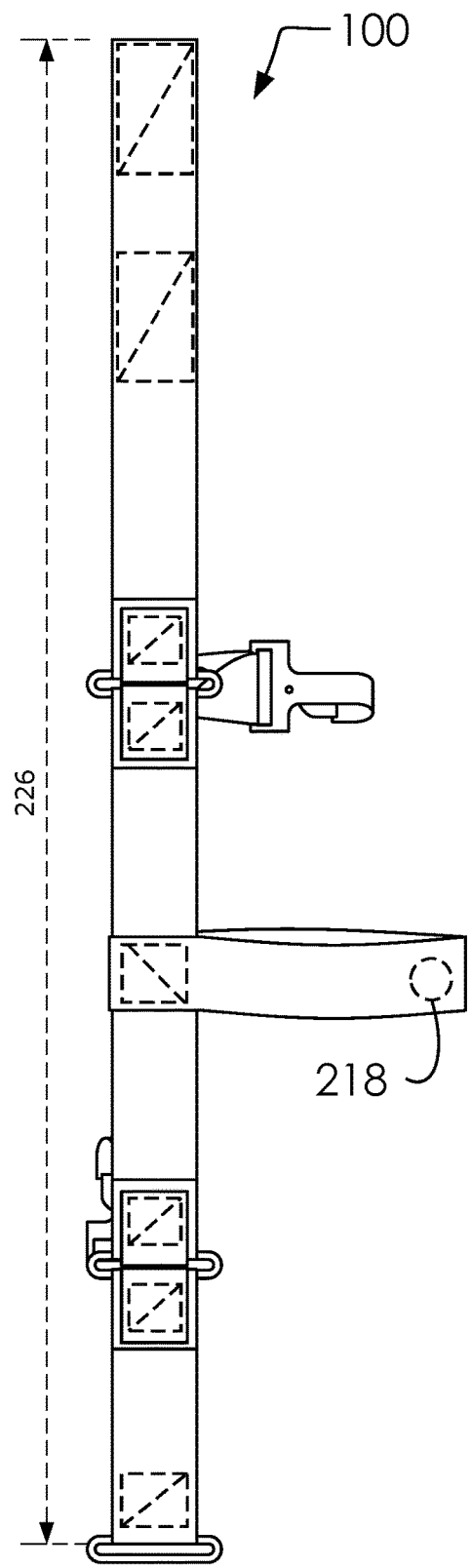

FIGS. 2A and 2B illustrate an elevated front and rear view of said tank tiedown system 100.

In one embodiment, said tank tiedown system 100 can comprise, one or more ring buckles 204 (which can comprise a first ring buckle 204a, a second ring buckle 204b, and a third ring buckle 204c), a stitching 206, a first hook-and-loop fastener assembly 208 (which can comprise a first fastener portion 208a, and a second fastener portion 208b), a one or more snap hook assemblies 210 (which can comprise a first snap hook assembly 210a, and a second snap hook assembly 210b), and a strap magnet 218.

Said perimeter strap assembly 120 can be created from a two or more straps 202 (which can comprise a first strap 202a, a second strap 202b, and a third strap 202c) attached to one another with said one or more ring buckles 204 and said stitching 206. Said perimeter strap assembly 120 can comprise a first end 212 and a second end 214. Said third strap 202c, said second strap 202b, and/or said first strap 202a adjustably attached to one another to create a single adjustable strap.

In one embodiment, said strap magnet 218 can hold a portion of said belt loop assembly 122 against a metal body such as said tank 104 to further ensure safety of said tank 104, and said tank tiedown system 100.

Said perimeter strap assembly 120 can comprise a strap length 226; wherein, said strap length 226 can be long enough to wrap around said tank 104, and double back to attach said first hook-and-loop fastener assembly 208 to one another.

Figure 3:
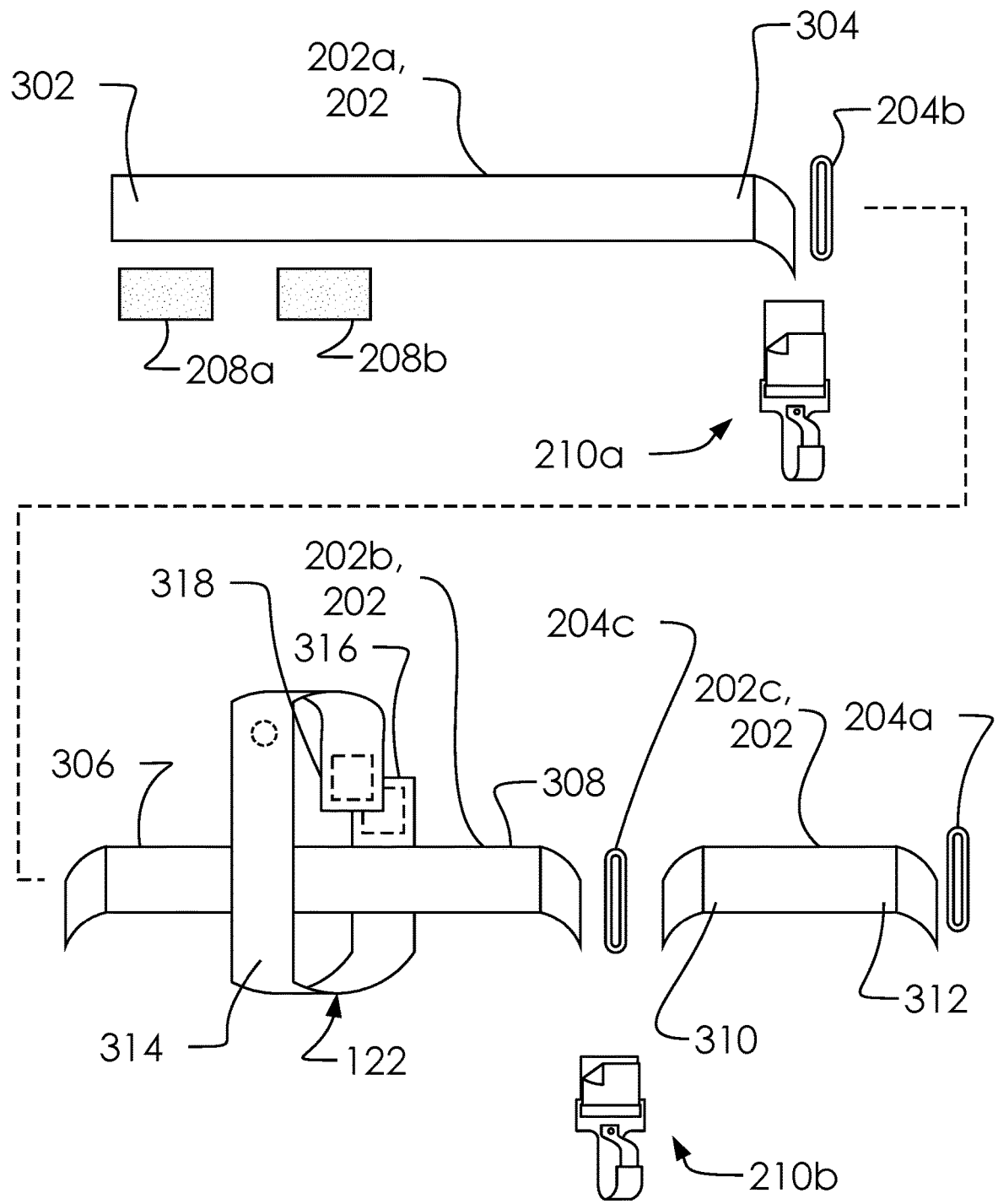
FIG. 3 illustrates an exploded elevated front view of said tank tiedown system 100.

FIG. 3 illustrates an exploded elevated front view of said tank tiedown system 100.

Said first strap 202a comprises a first end 302 and a second end 304; said second strap 202b comprises a first end 306 and a second end 308; and said third strap 202c comprises a first end 310 and a second end 312.

In one embodiment, attaching said two or more straps 202 to one another can comprise a sewn in process comprising looping one end of a strap through one among said one or more ring buckles 204, pulling a portion of said strap back through and sewing it back onto itself with said stitching 206. This sewn in process can be repeated with: said first end 306 and said second end 304 attached to said third ring buckle 204c; said first end 310 and said second end 308 attached to said first ring buckle 204a; and said second end 312 attached to said second ring buckle 204b.

In one embodiment, said first strap 202a is not sewn to said second ring buckle 204b, but can be selectively attached and detached using said first fastener portion 208a and said second fastener portion 208b by: attaching said first fastener portion 208a and said second fastener portion 208b to said first strap 202a with said first fastener portion 208a closer to said first end 302 of said first strap 202a than said second fastener portion 208b, feeding a portion of said first fastener portion 208a through said second ring buckle 204b, pulling a portion of said first fastener portion 208a back over a portion of said second fastener portion 208b, and pressing said first hook-and-loop fastener assembly 208 together.

In one embodiment, said one or more snap hook assemblies 210 can attach to a portion of said one or more ring buckles 204. For example, in one embodiment, said first snap hook assembly 210a can connect to said third ring buckle 204c, and said second snap hook assembly 210b can connect to said first ring buckle 204a.

In one embodiment, said stitching 206 can comprise a heavy duty thread of sufficient strength to secure said two or more straps 202 to one another and/or said first hook-and-loop fastener assembly 208.

In one embodiment, said belt loop assembly 122 can comprise a strap 314 comprising a first end 316 and a second end 318. Said belt loop assembly 122 can be wrapped around a portion of said perimeter strap assembly 120 (such as around said second strap 202b), with its ends sewn to a back side (that is interior portion) of said perimeter strap assembly 120. In one embodiment, each end of said strap 314 is pulled back around and sewn to itself using said stitching 206, as illustrated.

Figure 4A:
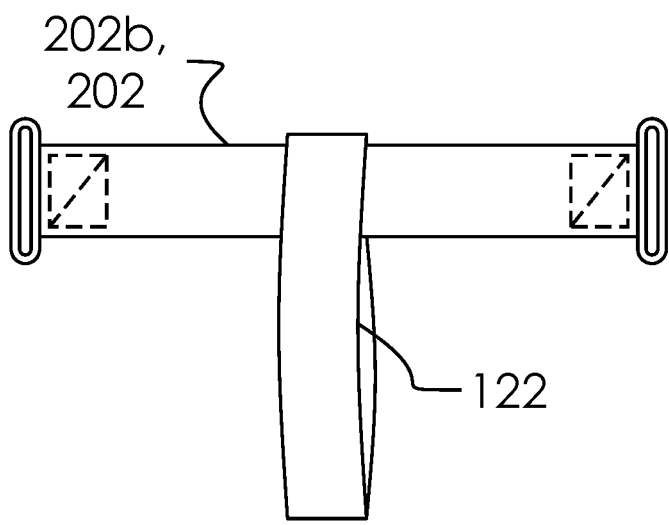
FIGS. 4A and 4B illustrate a front and rear elevated view of said belt loop assembly 122; respectively.
Figure 4B:
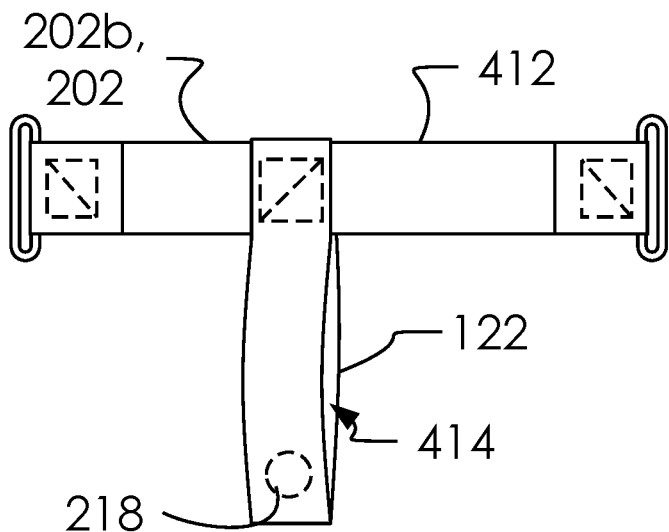

FIGS. 4A and 4B illustrate a front and rear elevated view of said belt loop assembly 122; respectively.

Said belt loop assembly 122 can be looped over a center section 412 of said second strap 202b between said first ring buckle 204a and said third ring buckle 204c with said strap 314.

Figure 5A:
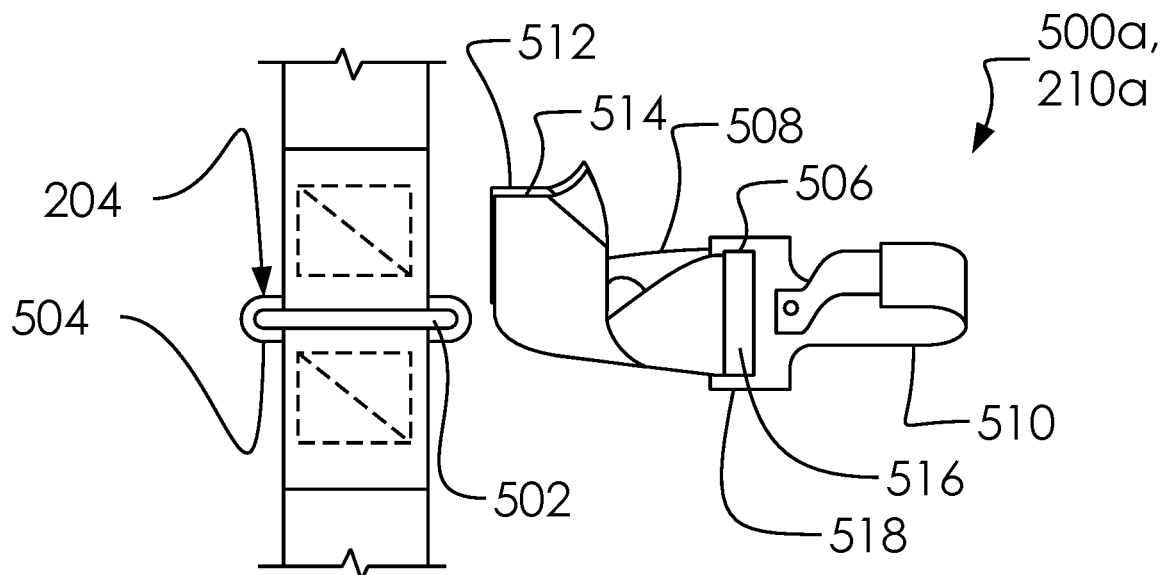
FIGS. 5A, 5B, and 5C illustrate an elevated overview of said first snap hook assembly 210*a* in a detached configuration 500*a*, a second configuration 500*b*, and an attached configuration 500*c*.
Figure 5B:
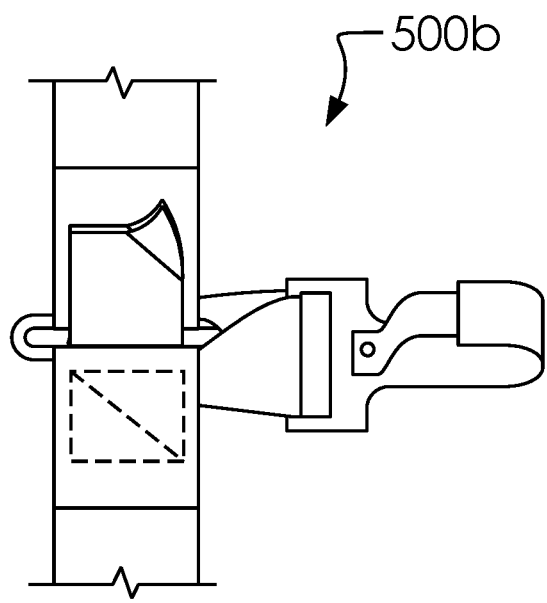
Figure 5C:
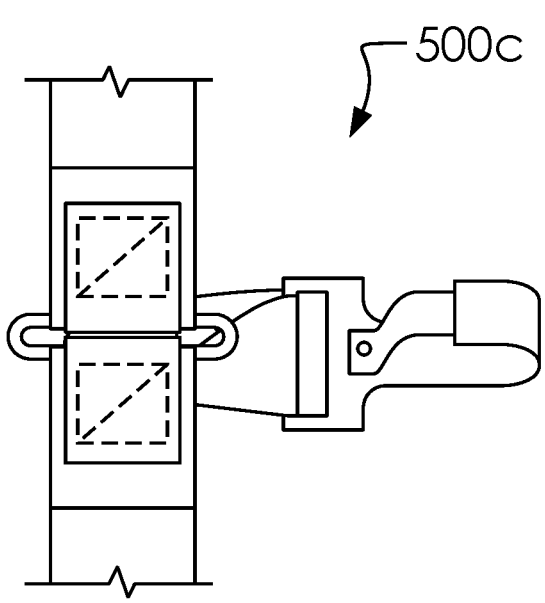

FIGS. 5A, 5B, and 5C illustrate an elevated overview of said first snap hook assembly 210a in a detached configuration 500a, a second configuration 500b, and an attached configuration 500c.

Said one or more ring buckles 204 can each comprise an eye 502 comprising an aperture within a ring rim 504.

In one embodiment, said one or more snap hook assemblies 210 can each comprise a strap aperture 506, a snap hook strap 508, and a snap hook 510. Said snap hook strap 508 comprises a first end 512 and a second end 514. Said strap aperture 506 comprise an eye 516 and a ring rim 518.

Attaching said one or more snap hook assemblies 210 to said one or more ring buckles 204 can comprise: sliding a portion of said snap hook strap 508 through said ring rim 518, pressing said first end 512 and said second end 514 of said snap hook strap 508 together (said detached configuration 500a) and sliding the ends through said eye 502 of said one or more ring buckles 204 (said second configuration 500b), and attaching each of said first end 512 and said second end 514 of said snap hook strap 508 to portions of said two or more straps 202 (said attached configuration 500c), as illustrated.

In one embodiment, said snap hook strap 508 can be sufficiently long to reach common anchor points, as discussed herein.

In one embodiment, said snap hook 510 can comprise strap metal claw snap hooks.

FIGS. 6A, 6B, 6C, 6D, 6E and 6F illustrate front, rear and side views of said first snap hook assembly 210a and said second snap hook assembly 210b.

In one embodiment, said second snap hook assembly 210b, and said first snap hook assembly 210a can each comprise a hook catch gap 600 being dissimilar to one another. Said first snap hook assembly 210a can comprise a first hook catch gap depth 602, and said second snap hook assembly 210b can comprise a second hook catch gap depth 604. In one embodiment, said second hook catch gap depth 604 can be larger than said first hook catch gap depth 602. For example, in one embodiment, said first hook catch gap depth 602 can comprise 9/32" and said second hook catch gap depth 604 can comprise ½".

Said first snap hook assembly 210a can comprise a first snap hook strap 606, and said second snap hook assembly 210b can comprise a second snap hook strap 608. In one embodiment, said first snap hook strap 606 can be longer than said second snap hook strap 608 and therefore said first snap hook assembly 210a can extend out further from said perimeter strap assembly 120 when assembled.

Each of said one or more snap hook assemblies 210 can comprise a hook portion 610, a clipping portion 612, and a hook width 614. Said hook width 614 can be the same for both said second snap hook assembly 210b, and said first snap hook assembly 210a.

Figure 7A:
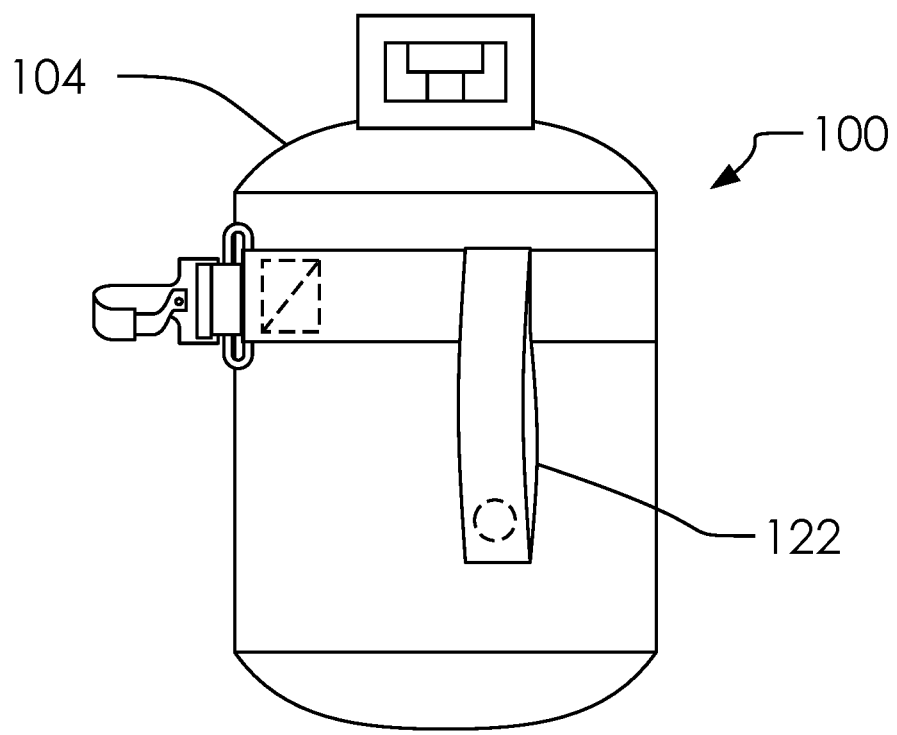
FIGS. 7A and 7B illustrate an elevated front and rear view of said tank 104 with said tank tiedown system 100 attached.
Figure 7B:
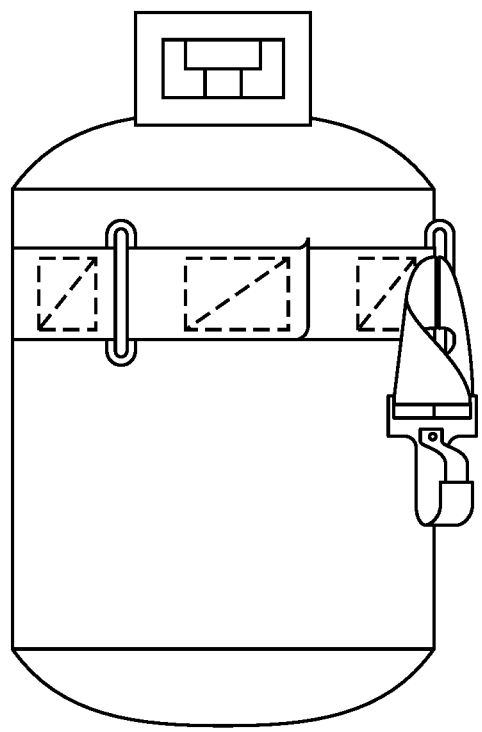

FIGS. 7A and 7B illustrate an elevated front and rear view of said tank 104 with said tank tiedown system 100 attached.

As illustrated, said strap magnet 218 can be used to secure a portion of said perimeter strap assembly 120 to said tank 104.

Figure 8:
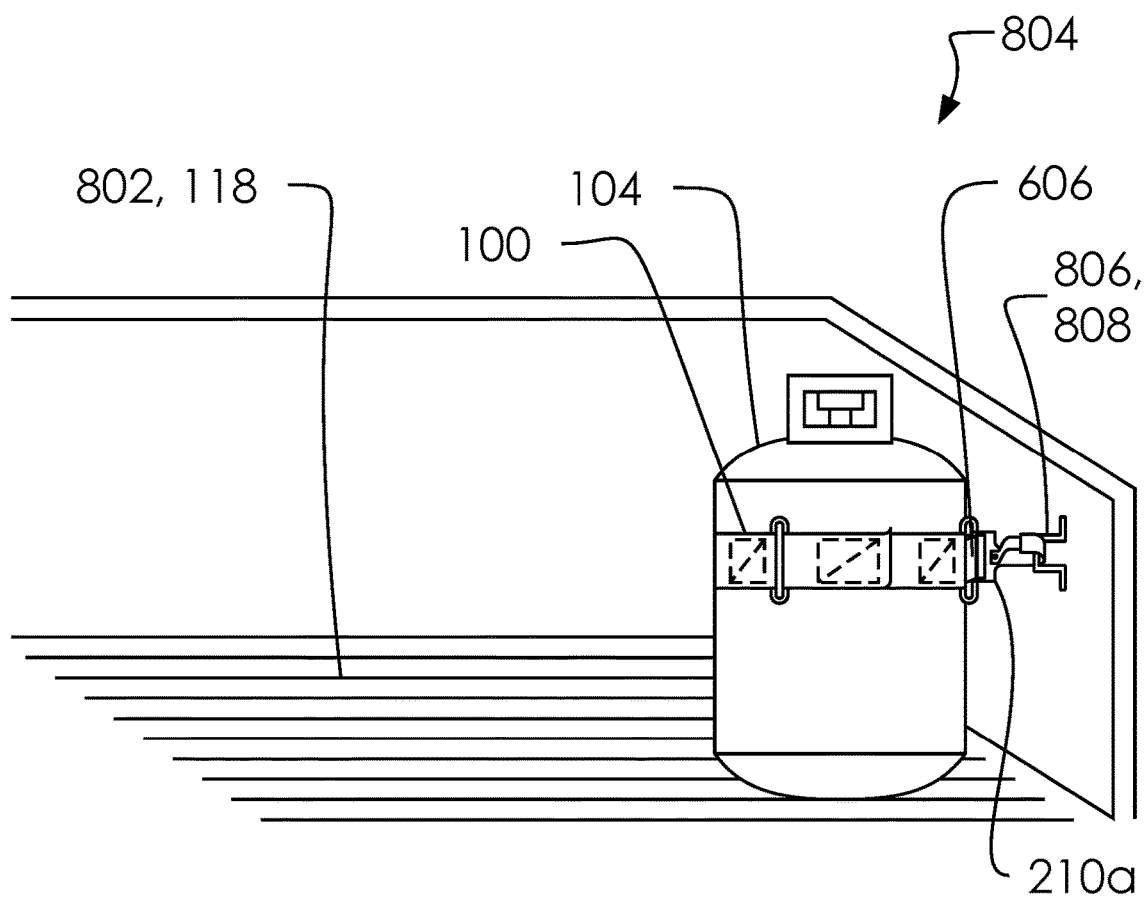
FIG. 8 illustrates a perspective overview of said tank tiedown system 100 in a truck bed 802 in a short hook installed configuration 804.

FIG. 8 illustrates a perspective overview of said tank tiedown system 100 in a truck bed 802 in a short hook installed configuration 804.

With said tank tiedown system 100 installed on said tank 104, said tank 104 can be hooked to a utility hook 806 or a child car connection point 902 (illustrated below) in said vehicle 118 for safe and convenient transport. Collectively said utility hook 806 or said child car connection point 902 can be referred to as an anchor point 808.

As illustrated, said first snap hook strap 606 is only long enough to attach to said perimeter strap assembly 120, extend through said third ring buckle 204c, and connect to said first snap hook assembly 210a without slack in said first snap hook strap 606. Accordingly, with said tank tiedown system 100 attached to said utility hook 806 with said first snap hook assembly 210a, said tank 104 does not have enough slack to bounce around.

In one embodiment, with one or more of said one or more snap hook assemblies 210 under a load or pressure, said perimeter strap assembly 120 can tighten around said tank 104.

In one embodiment, said tank tiedown system 100 can be installed on said side wall 106 at a height preferred by the end user. For example, said truck bed 802 and said utility hook 806 can require said tank tiedown system 100 relatively high on the cylindrical wall of said tank 104 to limit stretching to reach said utility hook 806. This functionality could be considered optional.

In one embodiment, a portion of said two or more straps 202 and/or said snap hook strap 508 can comprise rubber straps, so as to ensure said tank 104 is held tight to said vehicle 118 during transportation. This material change could improve durability and/or reduce costs.

In another embodiment, said two or more straps 202 and/or said snap hook strap 508 can comprise synthetic webbing, such as nylon, as is known in the art.

Figure 9:
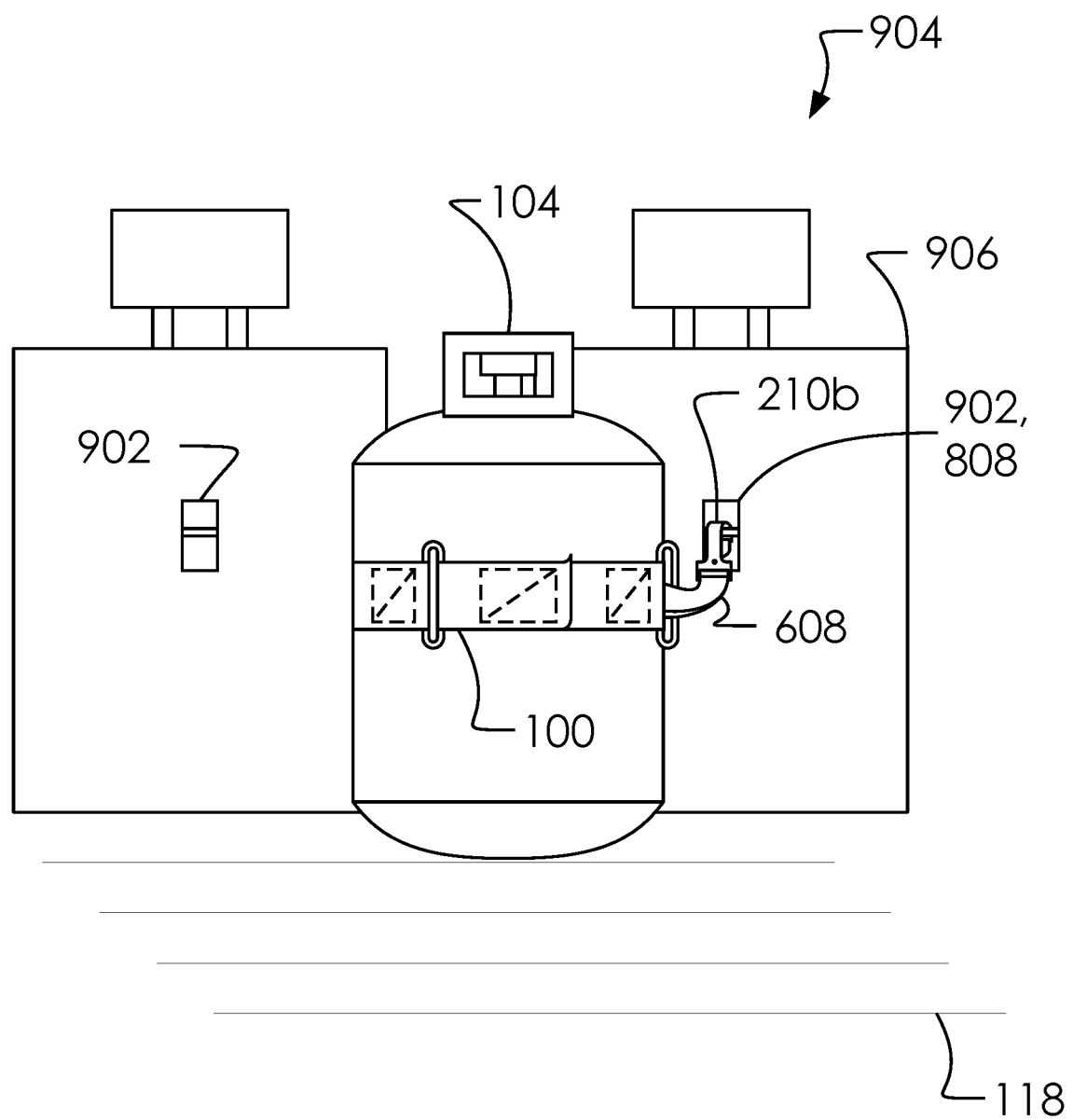
FIG. 9 illustrates an elevated rear view of a long hook installed configuration 904 with said tank tiedown system 100 attached to said child car connection point 902 in said vehicle 118.

FIG. 9 illustrates an elevated rear view of a long hook installed configuration 904 with said tank tiedown system 100 attached to said child car connection point 902 in said vehicle 118.

Using a similar procedure as discussed for said truck bed 802, said utility hook 806 can be used to secure said tank 104 with said tank tiedown system 100, as illustrated.

In one embodiment, both said second snap hook assembly 210b, and said first snap hook assembly 210a can be attached to one or more of said child car connection point 902. As illustrated here, said second snap hook assembly 210b is provided with said second snap hook strap 608 which is longer than said first snap hook strap 606, and therefore is able to rotate 90 degrees to hook to said child car connection point 902. In another embodiment, said first snap hook assembly 210a can be used where slack is not desired between said tank 104 and said child car connection point 902.

In one embodiment, said first hook catch gap depth 602 is wider to accommodate typical mounting points in trucks (such as said utility hook 806) and said second hook catch gap depth 604 can be more narrow to accommodate typical mounting points inside of vehicle cabins (such as said child car connection point 902).

Figure 10:
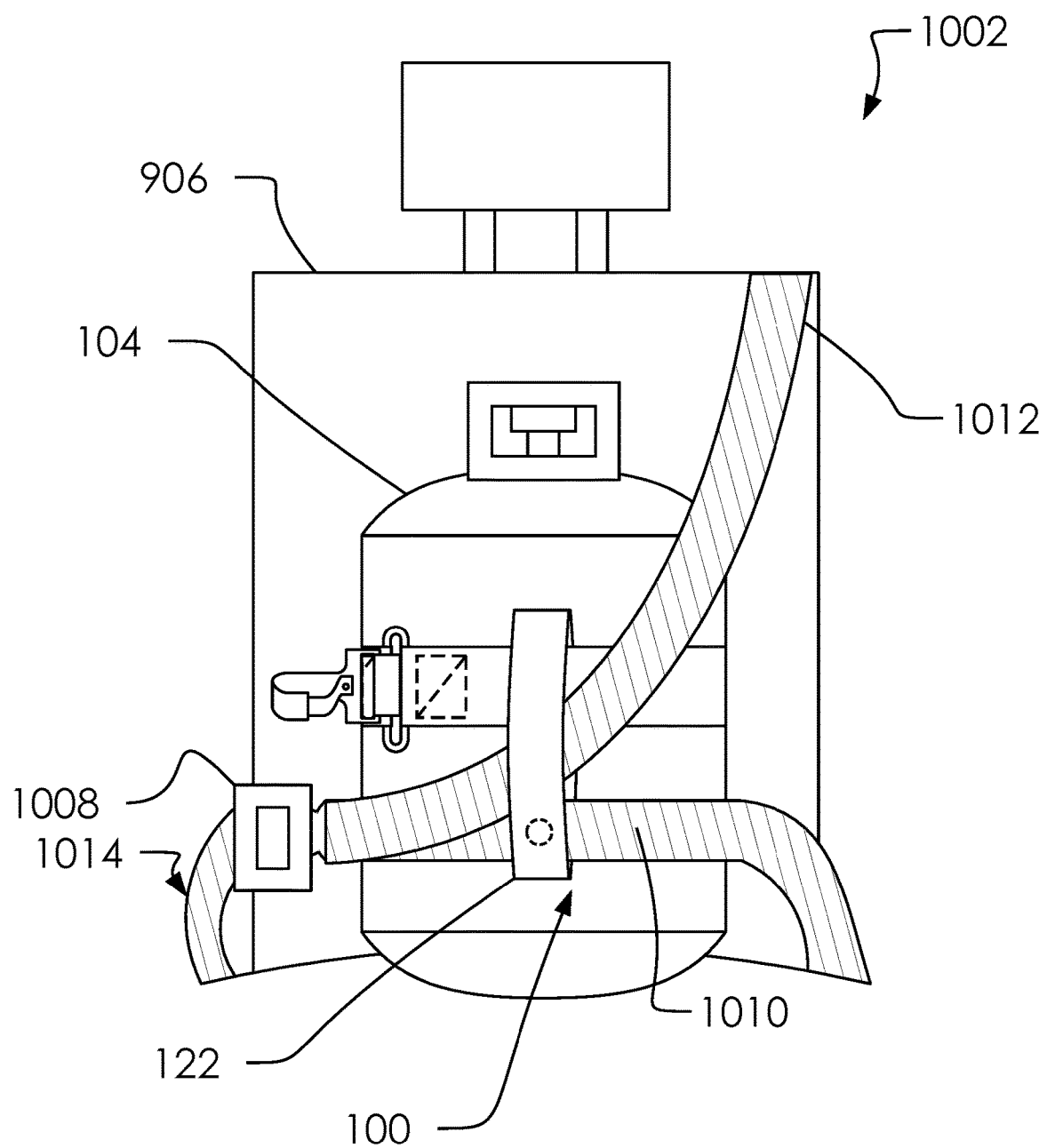
FIG. 10 illustrates a perspective overview of said tank tiedown system 100 in an installed seatbelt configuration 1002.

FIG. 10 illustrates a perspective overview of said tank tiedown system 100 in an installed seatbelt configuration 1002.

If an adequate anchor such as said utility hook 806 and/or said child car connection point 902 are not available, said tank 104 can be secured in a vehicle seat 906 by: placing said vehicle seatbelt 1012 between said belt loop assembly 122 and said perimeter strap assembly 120, securing with said belt loop assembly 122, and attaching said vehicle seatbelt 1012 to a seatbelt receiver 1008. In one embodiment, said tank tiedown system 100 can be positioned above a center of gravity on said side wall 106 to align said tank tiedown system 100 with a lower seatbelt portion 1010.

Each of the three transport vehicle connection methods are used independently and, as such, the two methods not in use could be considered optional. Further, each of the three transport vehicle connection methods (snap hook one, snap hook two and seatbelt strap) can be configured in any order along the length of said tank tiedown system 100 as part of the overall solution.

FIG. 11 illustrates a perspective overview of a tank tie down system 1102.

As illustrated, said tank tie down system 1102 and said tank tiedown system 100 can be similar in construction but for a few features. Namely, a double belt loop assembly 1104 rather than said belt loop assembly 122, and a loop restraint strap assembly 1106.

FIGS. 12A and 12B illustrate an elevated front and rear view of said double belt loop assembly 1104.

In one embodiment, said double belt loop assembly 1104 can comprise a loop assembly strap 1200 configured with a first loop 1202, a second loop 1204, a first stitches 1206 at a first end 1208, and a second stitches 1210 at a second end 1212.

Figure 13A:
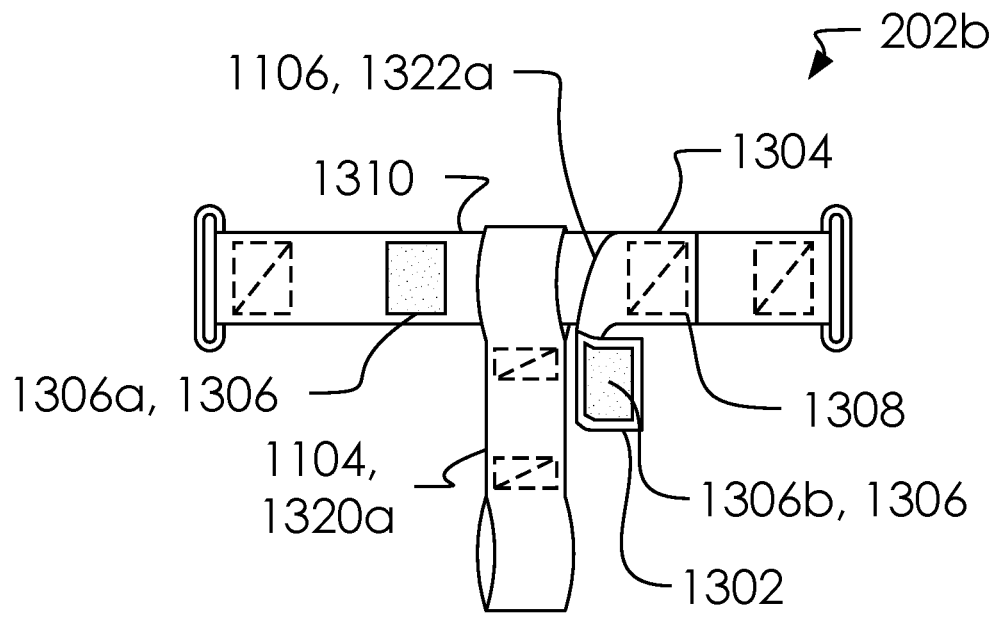
FIGS. 13A and 13B illustrate an elevated front and rear view of said second strap 202*b* with said double belt loop assembly 1104 and said loop restraint strap assembly 1106 of said tank tie down system 1102.
Figure 13B:
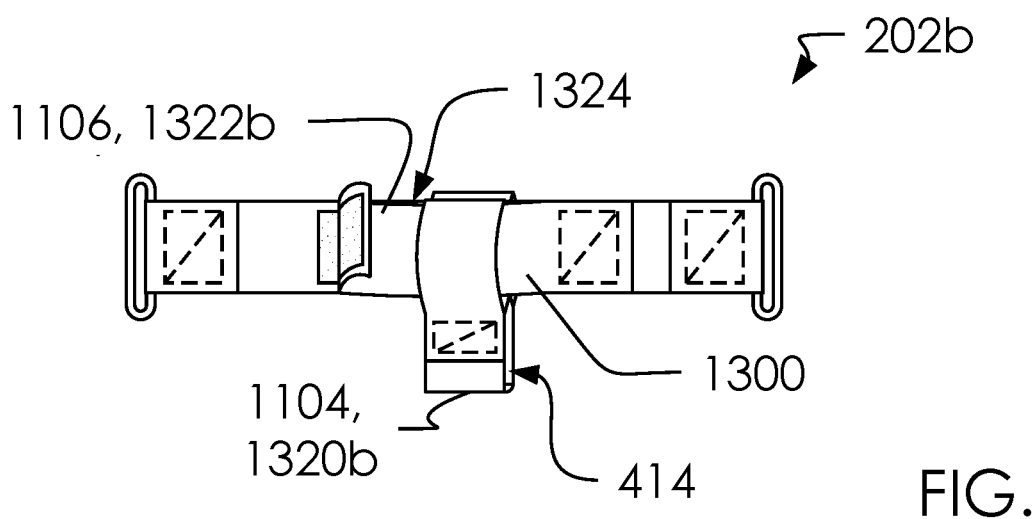

FIGS. 13A and 13B illustrate an elevated front and rear view of said second strap 202b with said double belt loop assembly 1104 and said loop restraint strap assembly 1106 of said tank tie down system 1102.

In one embodiment, said tank tie down system 1102 can comprise said second strap 202b with said double belt loop assembly 1104 and said loop restraint strap assembly 1106, as illustrated.

In one embodiment, said loop restraint strap assembly 1106 can comprise a restraint strap 1300 having a first end 1302 and a second end 1304, a second hook-and-loop fasteners 1306 (which can comprise a first portion 1306a, and a second portion 1306b), and a second end stitching 1308. Said second end stitching 1308 can attach said second end 1304 to a portion of said perimeter strap assembly 120. Said first end 1302 can comprise said second portion 1306b which can align with said first portion 1306a which is attached to a portion of said perimeter strap assembly 120.

Said double belt loop assembly 1104 can attach to said second strap 202b by: opening said loop restraint strap assembly 1106 (an open restraint configuration 1322a), sliding a portion of said second strap 202b through said first loop 1202 (a first loop configuration 1320a), sliding a portion of said loop restraint strap assembly 1106 through said second loop 1204 of said double belt loop assembly 1104 (a second loop configuration 1320b), and attaching said second portion 1306b of said loop restraint strap assembly 1106 to said first portion 1306a of said second strap 202b (a second restraint configuration 1322b).

In one embodiment, with said loop restraint strap assembly 1106 in said second restraint configuration 1322b there is a restraint gap 1324 formed between said second strap 202b and said restraint strap 1300. Likewise, with said double belt loop assembly 1104 in said second loop configuration 1320b, a belt loop gap 414 can be formed between said first end 1208 and said second end 1212 of said loop assembly strap 1200, as illustrated.

Figure 14:
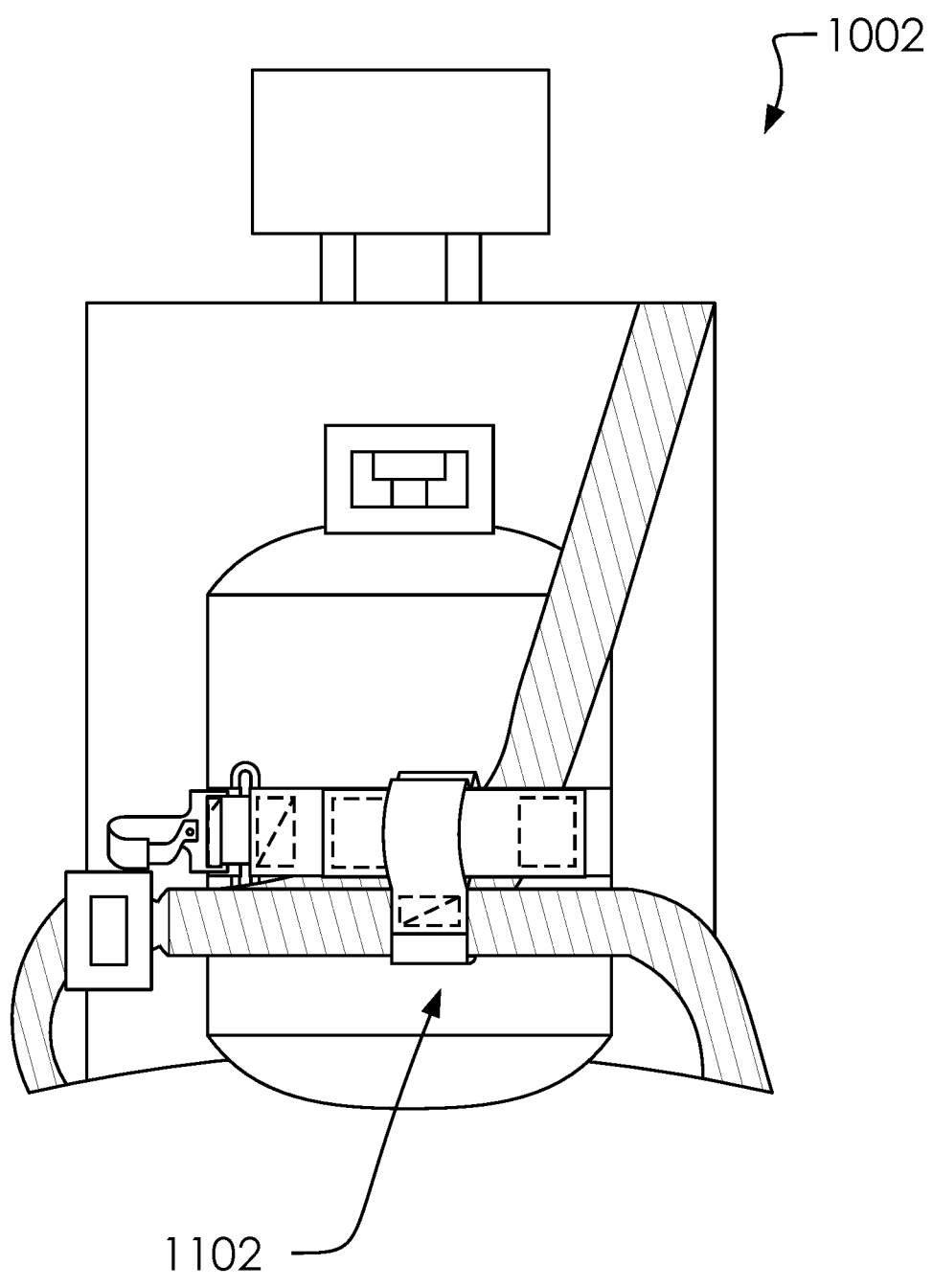
FIG. 14 illustrates an elevated front view of said tank tie down system 1102 in said installed seatbelt configuration 1002.

FIG. 14 illustrates an elevated front view of said tank tie down system 1102 in said installed seatbelt configuration 1002.

As illustrated, said tank tiedown system 100 and said tank tie down system 1102 can function in a similar manner viz a viz said installed seatbelt configuration 1002.

The following sentences are included with reference to the claims.

Said tank tiedown system 100 for securing said tank 104 during transport in said vehicle 118. Said tank tiedown system 100 comprises said perimeter strap assembly 120, said first hook-and-loop fastener assembly 208 having said first fastener portion 208a and said second fastener portion 208b, said one or more snap hook assemblies 210, and said one or more ring buckles 204, said one or more ring buckles 204 comprise at least said second ring buckle 204b. Said perimeter strap assembly 120 comprises said first end 212 and said second end 214. Said second ring buckle 204b can be attached to said second end 214 of said perimeter strap assembly 120. Said first fastener portion 208a and said second fastener portion 208b can be attached to said first end 212 of said perimeter strap assembly 120 with said first fastener portion 208a more proximate to said first end 212 than said second fastener portion 208b. Said perimeter strap assembly 120 comprises said strap length 226. Said strap length 226 can be long enough to secure said tank tiedown system 100 around said tank 104 by wrapping said perimeter strap assembly 120 around said tank 104, doubling a portion of said first end 212 back through said first ring buckle 204a, and attaching said first fastener portion 208a to said second fastener portion 208b of said first hook-and-loop fastener assembly 208. Said tank tiedown system 100 can comprise said variable diameter 114, and said tank 104 can comprise said tank diameter 116. Said tank tiedown system 100 can be configured to adjust said variable diameter 114 to match said variable diameter 114 and securely tighten around said tank 104. Said one or more snap hook assemblies 210 comprise at least said first snap hook assembly 210a. Said first snap hook assembly 210a attach to a portion of said perimeter strap assembly 120 and extends outward from said tank 104 with said tank tiedown system 100 attached around said tank 104. Said one or more snap hook assemblies 210 can be configured to selectively hook and release said anchor point 808 to securely hold said tank 104 with said tank tiedown system 100 within said vehicle 118.

Said perimeter strap assembly 120 can be created from said two or more straps 202. Said tank tiedown system 100 further comprises said one or more ring buckles 204 comprising at least said second ring buckle 204b and said first ring buckle 204a. Said two or more straps 202 attached to one another with said one or more ring buckles 204 and said stitching 206 to create a single adjustable strap. Said two or more straps 202 comprise at least said first strap 202a having said first end 302 and said second end 304, and said second strap 202b having said first end 306 and said second end 308. attaching said two or more straps 202 to one another comprises a sewn in process comprising looping one end of a strap through one among said one or more ring buckles 204, pulling a portion of said strap back through and sewing it back onto itself with said stitching 206. Said first strap 202a attaches to said second strap 202b by applying said sewn in process with: said second end 304 of said first strap 202a to said second ring buckle 204b, and said first end 306 of said second strap 202b to said second ring buckle 204b. Said one or more ring buckles 204 each comprise said eye 502 comprising an aperture within said ring rim 504. Said one or more snap hook assemblies 210 each comprise said strap aperture 506, said snap hook strap 508, and said snap hook 510. Said snap hook strap 508 comprises said first end 512 and said second end 514. Said strap aperture 506 comprise said eye 516 and said ring rim 518. Attaching said one or more snap hook assemblies 210 to said one or more ring buckles 204 comprises: sliding a portion of said snap hook strap 508 through said ring rim 518, pressing said first end 512 and said second end 514 of said snap hook strap 508 together, sliding the ends through said eye 502 of said one or more ring buckles 204, and attaching each of said first end 512 and said second end 514 of said snap hook strap 508 to portions of said two or more straps 202. Said first snap hook assembly 210a attaches to and extends from said second ring buckle 204b.

Said tank tiedown system 100 further comprises said stitching 206 said stitching 206 comprises a heavy duty thread of sufficient strength to secure said two or more straps 202 to one another and said first hook-and-loop fastener assembly 208.

Said one or more snap hook assemblies 210 further comprise said second snap hook assembly 210b. Said two or more straps 202 further comprise said third strap 202c. Said one or more ring buckles 204 further comprise said third ring buckle 204c. Said second strap 202b and said third strap 202c attach to one another with said third ring buckle 204c in the same manner as said first strap 202a and said second strap 202b attach to one another using said first ring buckle 204a. Said second snap hook assembly 210b attaches to said third ring buckle 204c.

Said first snap hook assembly 210a and said second snap hook assembly 210b each comprise said hook catch gap 600 and said snap hook strap 508 being dissimilar to one another. Said first snap hook assembly 210a comprises said first hook catch gap depth 602 and said first snap hook strap 606. Said second snap hook assembly 210b comprises said second hook catch gap depth 604 and said second snap hook strap 608. Said second hook catch gap depth 604 can be larger than said first hook catch gap depth 602. Said first snap hook strap 606 can be longer than said second snap hook strap 608 and therefore said first snap hook assembly 210a extends out further from said perimeter strap assembly 120 when said one or more snap hook assemblies 210 can be assembled with said perimeter strap assembly 120.

Said first hook catch gap depth 602 comprises 9/32" inch and said second hook catch gap depth 604 comprises ½" inch.

Said first hook catch gap depth 602 can be wider to accommodate said anchor point 808 in trucks such as said utility hook 806, said second hook catch gap depth 604 can be narrower to accommodate said anchor point 808 inside of vehicle cabins such as said child car connection point 902, and said second snap hook strap 608 can be longer than said first snap hook strap 606 and can be therefore able to rotate 90 degrees to hook to said child car connection point 902.

Said tank tiedown system 100 further comprises said belt loop assembly 122. Said belt loop assembly 122 attaches to a portion of said perimeter strap assembly 120. Said belt loop assembly 122 comprises said belt loop gap 414. Said belt loop gap 414 selectively receives a portion of said vehicle seatbelt 1012 prior to buckling said vehicle seatbelt 1012 to securely hold said tank 104 with said tank tiedown system 100 within said vehicle 118 with said vehicle seatbelt 1012 in a buckled configuration 1014.

Said belt loop assembly 122 comprises said strap 314 comprising said first end 316 and said second end 318. attaching said belt loop assembly 122 to said perimeter strap assembly 120 comprises: wrapping said belt loop assembly 122 around a portion of said perimeter strap assembly 120, and sewing said first end 316 and said second end 318 of said strap 314 to a back side of said perimeter strap assembly 120.

Said tank tiedown system 100 further comprises said strap magnet 218. Said strap magnet 218 can be attached to said belt loop assembly 122. Said strap magnet 218 holds a portion of said belt loop assembly 122 against a metal body such as said tank 104 to further ensure safety of said tank 104 and said tank tiedown system 100.

Said tank tiedown system 100 attaches to and remain attached to said tank 104 for the useful ownership period of said tank 104.

Said tank tiedown system 100 for securing said tank 104 during transport in said vehicle 118. Said tank tiedown system 100 comprises said perimeter strap assembly 120, said first hook-and-loop fastener assembly 208 having said first fastener portion 208a and said second fastener portion 208b, said one or more snap hook assemblies 210, and said one or more ring buckles 204, said one or more ring buckles 204 comprise at least said second ring buckle 204b. Said perimeter strap assembly 120 comprises said first end 212 and said second end 214. Said second ring buckle 204b can be attached to said second end 214 of said perimeter strap assembly 120. Said first fastener portion 208a and said second fastener portion 208b can be attached to said first end 212 of said perimeter strap assembly 120 with said first fastener portion 208a more proximate to said first end 212 than said second fastener portion 208b. Said perimeter strap assembly 120 comprises said strap length 226. Said strap length 226 can be long enough to secure said tank tiedown system 100 around said tank 104 by wrapping said perimeter strap assembly 120 around said tank 104, doubling a portion of said first end 212 back through said first ring buckle 204a, and attaching said first fastener portion 208a to said second fastener portion 208b of said first hook-and-loop fastener assembly 208. Said tank tiedown system 100 can comprise said variable diameter 114, and said tank 104 can comprise said tank diameter 116. Said tank tiedown system 100 can be configured to adjust said variable diameter 114 to match said variable diameter 114 and securely tighten around said tank 104. Said one or more snap hook assemblies 210 comprise at least said first snap hook assembly 210a. Said first snap hook assembly 210a attach to a portion of said perimeter strap assembly 120 and extends outward from said tank 104 with said tank tiedown system 100 attached around said tank 104. Said one or more snap hook assemblies 210 can be configured to selectively hook and release said anchor point 808 to securely hold said tank 104 with said tank tiedown system 100 within said vehicle 118. Said tank tiedown system 100 further comprises said belt loop assembly 122. Said belt loop assembly 122 attaches to a portion of said perimeter strap assembly 120. Said belt loop assembly 122 comprises said belt loop gap 414. Said belt loop gap 414 selectively receives a portion of said vehicle seatbelt 1012 prior to buckling said vehicle seatbelt 1012 to securely hold said tank 104 with said tank tiedown system 100 within said vehicle 118 with said vehicle seatbelt 1012 in said buckled configuration 1014.

Said belt loop assembly 122 comprises said strap 314 comprising said first end 316 and said second end 318. attaching said belt loop assembly 122 to said perimeter strap assembly 120 comprises: wrapping said belt loop assembly 122 around a portion of said perimeter strap assembly 120, and sewing said first end 316 and said second end 318 of said strap 314 to a back side of said perimeter strap assembly 120.

Said perimeter strap assembly 120 can be created from said two or more straps 202. Said tank tiedown system 100 further comprises said one or more ring buckles 204 comprising at least said second ring buckle 204b and said first ring buckle 204a. Said two or more straps 202 attached to one another with said one or more ring buckles 204 and said stitching 206 to create a single adjustable strap. Said two or more straps 202 comprise at least said first strap 202a having said first end 302 and said second end 304, and said second strap 202b having said first end 306 and said second end 308. attaching said two or more straps 202 to one another comprises a sewn in process comprising looping one end of a strap through one among said one or more ring buckles 204, pulling a portion of said strap back through and sewing it back onto itself with said stitching 206. Said first strap 202a attaches to said second strap 202b by applying said sewn in process with: said second end 304 of said first strap 202a to said second ring buckle 204b, and said first end 306 of said second strap 202b to said second ring buckle 204b. Said one or more ring buckles 204 each comprise said eye 502 comprising an aperture within said ring rim 504. Said one or more snap hook assemblies 210 each comprise said strap aperture 506, said snap hook strap 508, and said snap hook 510. Said snap hook strap 508 comprises said first end 512 and said second end 514. Said strap aperture 506 comprise said eye 516 and said ring rim 518. Attaching said one or more snap hook assemblies 210 to said one or more ring buckles 204 comprises: sliding a portion of said snap hook strap 508 through said ring rim 518, pressing said first end 512 and said second end 514 of said snap hook strap 508 together, sliding the ends through said eye 502 of said one or more ring buckles 204, and attaching each of said first end 512 and said second end 514 of said snap hook strap 508 to portions of said two or more straps 202. Said first snap hook assembly 210a attaches to and extends from said second ring buckle 204b.

Said one or more snap hook assemblies 210 further comprise said second snap hook assembly 210b. Said two or more straps 202 further comprise said third strap 202c. Said one or more ring buckles 204 further comprise said third ring buckle 204c. Said second strap 202b and said third strap 202c attach to one another with said third ring buckle 204c in the same manner as said first strap 202a and said second strap 202b attach to one another using said first ring buckle 204a. Said second snap hook assembly 210b attaches to said third ring buckle 204c.

Said tank tiedown system 100 for securing said tank 104 during transport in said vehicle 118. Said tank tiedown system 100 comprises said perimeter strap assembly 120, said first hook-and-loop fastener assembly 208 having said first fastener portion 208a and said second fastener portion 208b, said one or more snap hook assemblies 210, and said one or more ring buckles 204, said one or more ring buckles 204 comprise at least said second ring buckle 204b. Said perimeter strap assembly 120 comprises said first end 212 and said second end 214. Said second ring buckle 204b can be attached to said second end 214 of said perimeter strap assembly 120. Said first fastener portion 208a and said second fastener portion 208b can be attached to said first end 212 of said perimeter strap assembly 120 with said first fastener portion 208a more proximate to said first end 212 than said second fastener portion 208b. Said perimeter strap assembly 120 comprises said strap length 226. Said strap length 226 can be long enough to secure said tank tiedown system 100 around said tank 104 by wrapping said perimeter strap assembly 120 around said tank 104, doubling a portion of said first end 212 back through said first ring buckle 204a, and attaching said first fastener portion 208a to said second fastener portion 208b of said first hook-and-loop fastener assembly 208. Said tank tiedown system 100 can comprise said variable diameter 114, and said tank 104 can comprise said tank diameter 116. Said tank tiedown system 100 can be configured to adjust said variable diameter 114 to match said variable diameter 114 and securely tighten around said tank 104. Said one or more snap hook assemblies 210 comprise at least said first snap hook assembly 210a. Said first snap hook assembly 210a attach to a portion of said perimeter strap assembly 120 and extends outward from said tank 104 with said tank tiedown system 100 attached around said tank 104. Said one or more snap hook assemblies 210 can be configured to selectively hook and release said anchor point 808 to securely hold said tank 104 with said tank tiedown system 100 within said vehicle 118. Said tank tiedown system 100 further comprises said belt loop assembly 122. Said belt loop assembly 122 attaches to a portion of said perimeter strap assembly 120. Said belt loop assembly 122 comprises said belt loop gap 414. Said belt loop gap 414 selectively receives a portion of said vehicle seatbelt 1012 prior to buckling said vehicle seatbelt 1012 to securely hold said tank 104 with said tank tiedown system 100 within said vehicle 118 with said vehicle seatbelt 1012 in said buckled configuration 1014. Said belt loop assembly 122 comprises said strap 314 comprising said first end 316 and said second end 318. attaching said belt loop assembly 122 to said perimeter strap assembly 120 comprises: wrapping said belt loop assembly 122 around a portion of said perimeter strap assembly 120, and sewing said first end 316 and said second end 318 of said strap 314 to a back side of said perimeter strap assembly 120.

Said tank tiedown system 100 further comprises said strap magnet 218. Said strap magnet 218 can be attached to said belt loop assembly 122. Said strap magnet 218 holds a portion of said belt loop assembly 122 against a metal body such as said tank 104 to further ensure safety of said tank 104 and said tank tiedown system 100.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of 100/should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:
1. A tank tiedown system for securing a tank during transport in a vehicle, wherein:
   said tank tiedown system comprises a perimeter strap assembly, a first hook-and-loop fastener assembly having a first fastener portion and a second fastener portion, a one or more snap hook assemblies, and one or more ring buckles,
   said one or more ring buckles comprise at least a first ring buckle;
   said perimeter strap assembly comprises a first end and a second end;
   said first ring buckle is attached to said second end of said perimeter strap assembly;
   said first fastener portion and said second fastener portion are attached to said first end of said perimeter strap assembly with said first fastener portion more proximate to said first end than said second fastener portion;
   said perimeter strap assembly comprises a strap length;
   said strap length is long enough to secure said tank tiedown system around said tank by
      wrapping said perimeter strap assembly around said tank,
      doubling a portion of said first end back through said first ring buckle, and attaching said first fastener portion to said second fastener portion of said first hook-and-loop fastener assembly;

said tank tiedown system can comprise a variable diameter, and said tank can comprise a tank diameter;

said tank tiedown system can be configured to adjust said variable diameter to match said tank diameter and securely tighten around said tank;

said one or more snap hook assemblies comprise at least a first snap hook assembly;

said first snap hook assembly attaches to a portion of said perimeter strap assembly and extends outward from said tank with said tank tiedown system attached around said tank;

said one or more snap hook assemblies are configured to selectively hook and release an anchor point to securely hold said tank with said tank tiedown system within said vehicle;

each among said one or more snap hook assemblies comprise a hook catch gap, a hook portion, and a clipping portion;

said hook portion and said clipping portion comprise a loop around said hook catch gap; and said clipping portion is configured to selectively open and close to allow said one or more snap hook assemblies to snap around said anchor point and securely hold said tank to said anchor point.

2. The tank tiedown system of claim 1, wherein:

said perimeter strap assembly is created from a two or more straps;

said tank tiedown system further comprises said one or more ring buckles comprising at least said second ring buckle and said first ring buckle;

said two or more straps attached to one another with said one or more ring buckles and a stitching to create a single adjustable strap;

said two or more straps comprise at least
 a first strap having a first end and a second end, and
 a second strap having a first end and a second end;

attaching said two or more straps to one another comprises a sewn in process comprising
 looping one end of a strap through one among said one or more ring buckles,
 pulling a portion of said strap back through and sewing it back onto itself with said stitching;

said first strap attaches to said second strap by applying said sewn in process with:
 said second end of said first strap to said second ring buckle, and
 said first end of said second strap to said second ring buckle;

said one or more ring buckles each comprise an eye comprising an aperture within a ring rim;

said one or more snap hook assemblies each comprise a strap aperture, a snap hook strap, and a snap hook;

said snap hook strap comprises a first end and a second end;

said strap aperture comprise an eye and a ring rim;

attaching said one or more snap hook assemblies to said one or more ring buckles comprises:
 sliding a portion of said snap hook strap through said ring rim,
 pressing said first end and said second end of said snap hook strap together,
 sliding said first end and said second end through said eye of said one or more ring buckles, and
 attaching said first end of said snap hook strap to one among said two or more straps and said second end of said snap hook strap to a different one among of said two or more straps; and said first snap hook assembly attaches to and extends from said second ring buckle.

3. The tank tiedown system of claim 2, wherein:

said tank tiedown system further comprises said stitching; and said stitching is configured to secure said two or more straps to one another and said first hook-and-loop fastener assembly.

4. The tank tiedown system of claim 2, wherein:

said one or more snap hook assemblies further comprise a second snap hook assembly;

said two or more straps further comprise a third strap;

said one or more ring buckles further comprise a third ring buckle;

said second strap and said third strap attach to one another with said third ring buckle in the same manner as said first strap and said second strap attach to one another using said first ring buckle; and said second snap hook assembly attaches to said third ring buckle.

5. The tank tiedown system of claim 4, wherein:

said first snap hook assembly and said second snap hook assembly each comprise said hook catch gap and said snap hook strap being dissimilar to one another;

said first snap hook assembly comprises a first hook catch gap depth and a first snap hook strap;

said second snap hook assembly comprises a second hook catch gap depth and a second snap hook strap;

said second hook catch gap depth is larger than said first hook catch gap depth; and said first snap hook strap is longer than said second snap hook strap and therefore said first snap hook assembly extends out further from said perimeter strap assembly when said one or more snap hook assemblies are assembled with said perimeter strap assembly.

6. The tank tiedown system of claim 5, wherein:

said first hook catch gap depth comprises 9/32" inch and said second hook catch gap depth comprises ½" inch.

7. The tank tiedown system of claim 6, wherein:

said first hook catch gap depth is wider to accommodate said anchor point in trucks such as a utility hook, said second hook catch gap depth is narrower to accommodate said anchor point inside of vehicle cabins such as a child car connection point, and said second snap hook strap is longer than said first snap hook strap and is therefore able to rotate 90 degrees to hook to said child car connection point.

8. The tank tiedown system of claim 1, wherein:

said tank tiedown system further comprises a belt loop assembly;

said belt loop assembly attaches to a portion of said perimeter strap assembly;

said belt loop assembly comprises a belt loop gap; and said belt loop gap selectively receives a portion of vehicle seatbelt prior to buckling said vehicle seatbelt to securely hold said tank with said tank tiedown system within said vehicle with said vehicle seatbelt in a buckled configuration.

9. The tank tiedown system of claim 8, wherein:

said belt loop assembly comprises a strap comprising a first end and a second end;

attaching said belt loop assembly to said perimeter strap assembly comprises:

wrapping said belt loop assembly around a portion of said perimeter strap assembly, and sewing said first end and said second end of said strap to a back side of said perimeter strap assembly.

10. The tank tiedown system of claim 9, wherein:

said tank tiedown system further comprises a strap magnet;

said strap magnet is attached to said belt loop assembly; and said strap magnet holds a portion of said belt loop assembly against a metal body such as said tank.

11. The tank tiedown system of claim 1, wherein, said tank tiedown system attaches to and remains attached to said tank for the useful ownership period of said tank.

12. A tank tiedown system for securing a tank during transport in a vehicle, wherein:

said tank tiedown system comprises a perimeter strap assembly, a first hook-and-loop fastener assembly having a first fastener portion and a second fastener portion, a one or more snap hook assemblies, and one or more ring buckles, said one or more ring buckles comprise at least a first ring buckle;

said perimeter strap assembly comprises a first end and a second end;

said first ring buckle is attached to said second end of said perimeter strap assembly;

said first fastener portion and said second fastener portion are attached to said first end of said perimeter strap assembly with said first fastener portion more proximate to said first end than said second fastener portion;

said perimeter strap assembly comprises a strap length;

said strap length is long enough to secure said tank tiedown system around said tank by wrapping said perimeter strap assembly around said tank, doubling a portion of said first end back through said second ring buckle, and attaching said first fastener portion to said second fastener portion of said first hook-and-loop fastener assembly;

said tank tiedown system can comprise a variable diameter, and said tank can comprise a tank diameter;

said tank tiedown system can be configured to adjust said variable diameter to match said tank diameter and securely tighten around said tank;

said one or more snap hook assemblies comprise at least a first snap hook assembly;

said first snap hook assembly attaches to a portion of said perimeter strap assembly and extends outward from said tank with said tank tiedown system attached around said tank;

said one or more snap hook assemblies are configured to selectively hook and release an anchor point to securely hold said tank with said tank tiedown system within said vehicle;

said tank tiedown system further comprises a belt loop assembly;

said belt loop assembly attaches to a portion of said perimeter strap assembly;

said belt loop assembly comprises a belt loop gap; and said belt loop gap selectively receives a portion of vehicle seatbelt prior to buckling said vehicle seatbelt to securely hold said tank with said tank tiedown system within said vehicle with said vehicle seatbelt in a buckled configuration.

13. The tank tiedown system of claim 12, wherein:

said belt loop assembly comprises a strap comprising a first end and a second end;

attaching said belt loop assembly to said perimeter strap assembly comprises:

wrapping said belt loop assembly around a portion of said perimeter strap assembly, and sewing said first end and said second end of said strap to a back side of said perimeter strap assembly.

14. The tank tiedown system of claim 13, wherein:

said tank tiedown system further comprises a strap magnet;

said strap magnet is attached to said belt loop assembly; and said strap magnet holds a portion of said belt loop assembly against a metal body such as said tank.

15. The tank tiedown system of claim 14, wherein:

said perimeter strap assembly is created from a two or more straps;

said tank tiedown system further comprises said one or more ring buckles comprising at least a second ring buckle and said first ring buckle;

said two or more straps attached to one another with said one or more ring buckles and a stitching to create a single adjustable strap;

said two or more straps comprise at least a first strap having a first end and a second end, and a second strap having a first end and a second end;

attaching said two or more straps to one another comprises a sewn in process comprising looping one end of a strap through one among said one or more ring buckles, pulling a portion of said strap back through and sewing it back onto itself with said stitching;

said first strap attaches to said second strap by applying said sewn in process with:

said second end of said first strap to said second ring buckle, and said first end of said second strap to said second ring buckle;

said one or more ring buckles each comprise an eye comprising an aperture within a ring rim;

said one or more snap hook assemblies each comprise a strap aperture, a snap hook strap, and a snap hook;

said snap hook strap comprises a first end and a second end;

said strap aperture comprise an eye and a ring rim;

attaching said one or more snap hook assemblies to said one or more ring buckles comprises:

sliding a portion of said snap hook strap through said ring rim, pressing said first end and said second end of said snap hook strap together, sliding the ends through said eye of said one or more ring buckles, and attaching said first end of said snap hook strap to one among said two or more straps and said second end of said snap hook strap to a different one among of said two or more straps; and said first snap hook assembly attaches to and extends from said second ring buckle.

16. The tank tiedown system of claim 15, wherein:

said one or more snap hook assemblies further comprise a second snap hook assembly;

said two or more straps further comprise a third strap;

said one or more ring buckles further comprise a third ring buckle;

said second strap and said third strap attach to one another with said third ring buckle in the same manner as said first strap and said second strap attach to one another using said first ring buckle; and said second snap hook assembly attaches to said third ring buckle.

17. A tank tiedown system for securing a tank during transport in a vehicle, wherein:
said tank tiedown system comprises a perimeter strap assembly, a first hook-and-loop fastener assembly having a first fastener portion and a second fastener portion, a one or more snap hook assemblies, and one or more ring buckles,
said one or more ring buckles comprise at least a first ring buckle;
said perimeter strap assembly comprises a first end and a second end;
said first ring buckle is attached to said second end of said perimeter strap assembly;
said first fastener portion and said second fastener portion are attached to said first end of said perimeter strap assembly with said first fastener portion more proximate to said first end than said second fastener portion;
said perimeter strap assembly comprises a strap length;
said strap length is long enough to secure said tank tiedown system around said tank by
wrapping said perimeter strap assembly around said tank,
doubling a portion of said first end back through said first ring buckle, and
attaching said first fastener portion to said second fastener portion of said first hook-and-loop fastener assembly;
said tank tiedown system can comprise a variable diameter, and said tank can comprise a tank diameter;
said tank tiedown system can be configured to adjust said variable diameter to match said tank diameter and securely tighten around said tank;
said one or more snap hook assemblies comprise at least a first snap hook assembly;
said first snap hook assembly attaches to a portion of said perimeter strap assembly and extends outward from said tank with said tank tiedown system attached around said tank;
said one or more snap hook assemblies are configured to selectively hook and release an anchor point to securely hold said tank with said tank tiedown system within said vehicle;
said one or more snap hook assemblies further comprise a second snap hook assembly;
said two or more straps further comprise a third strap;
said one or more ring buckles further comprise a third ring buckle;
said second strap and said third strap attach to one another with said third ring buckle in the same manner as said first strap and said second strap attach to one another using said first ring buckle; and
said second snap hook assembly attaches to said third ring buckle.

* * * * *